United States Patent
Cook

(10) Patent No.: US 11,067,414 B1
(45) Date of Patent: Jul. 20, 2021

(54) TRANSMITTER AND RECEIVER CONFIGURATION FOR INDUCTIVE POSITION ENCODER

(71) Applicant: Mitutoyo Corporation, Kanagawa-ken (JP)

(72) Inventor: Ted Staton Cook, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 0 days.

(21) Appl. No.: 16/826,842

(22) Filed: Mar. 23, 2020

(51) Int. Cl.
*G01D 5/20* (2006.01)

(52) U.S. Cl.
CPC ................... *G01D 5/204* (2013.01)

(58) Field of Classification Search
CPC ...... G01B 7/003; G01B 3/205; G01D 5/2053; G01D 5/20; G01D 5/204; G01D 5/2046; G01D 5/2497; G01D 5/2452; G01D 5/2013; G01D 5/2216; G01D 5/202
See application file for complete search history.

(56) References Cited

U.S. PATENT DOCUMENTS

| | | | |
|---|---|---|---|
| 5,841,274 A | 11/1998 | Masreliez et al. | |
| 5,886,519 A * | 3/1999 | Masreliez | G01B 7/003 324/207.17 |
| 5,894,678 A | 4/1999 | Masreliez et al. | |
| 5,901,458 A | 5/1999 | Andermo et al. | |
| 5,936,399 A | 8/1999 | Andermo et al. | |
| 5,973,494 A | 10/1999 | Masreliez et al. | |
| 5,998,990 A | 12/1999 | Andermo et al. | |
| 6,002,250 A | 12/1999 | Masreliez et al. | |
| 6,011,389 A | 1/2000 | Masreliez et al. | |
| 6,049,204 A | 4/2000 | Andermo et al. | |
| 6,124,708 A * | 9/2000 | Dames | G01D 5/2053 324/207.12 |
| 6,157,188 A | 12/2000 | Steinke | |
| 6,259,249 B1 | 7/2001 | Miyata | |
| 6,329,813 B1 | 12/2001 | Andermo | |
| 6,335,618 B1 | 1/2002 | Nahum | |

(Continued)

FOREIGN PATENT DOCUMENTS

| | | |
|---|---|---|
| CN | 1272620 A | 11/2000 |
| CN | 1441226 A | 9/2003 |

(Continued)

*Primary Examiner* — Alesa Allgood
(74) *Attorney, Agent, or Firm* — Seed IP Law Group LLP

(57) ABSTRACT

An electronic position encoder includes a scale and a detector. The detector includes a field generating coil (FGC) having elongated portions bounding a generated field area, and a sensing area, both aligned along the scale. Sensing elements in the sensing area provide position signals responsive to the scale interacting with the generated field. Sensing elements and elongated portions are fabricated in "front" layers of the detector portion. A crosswise shielded end section (SES) fabricated in a "rear" layer connects the elongated portions via feedthroughs. The sensing element area is longer than the elongated portions of the FGC. A projection of the SES normal to the layers overlaps sensing elements in the sensing element area. A conductive shield region CSR is configured in a CSR layer interposed between the front and rear layers to intercept at least a majority of the projection of the SES toward the overlapped sensing elements.

18 Claims, 9 Drawing Sheets

(56) References Cited

U.S. PATENT DOCUMENTS

| | | |
|---|---|---|
| 6,400,138 B1 | 6/2002 | Andermo |
| 6,522,129 B2 | 2/2003 | Miyata et al. |
| 6,531,866 B2 | 3/2003 | Miyata et al. |
| 6,545,461 B1 | 4/2003 | Miyata |
| 6,573,707 B2 | 6/2003 | Kiriyama et al. |
| 6,628,115 B2 | 9/2003 | Sasaki et al. |
| 6,646,433 B2 | 11/2003 | Milvich |
| 6,646,434 B2 | 11/2003 | Miyata et al. |
| 6,714,004 B2 | 3/2004 | Jagiella |
| 6,720,760 B2 | 4/2004 | Milvich |
| 7,015,687 B2 | 3/2006 | Meyer |
| 7,239,130 B1 | 7/2007 | Milvich |
| 7,530,177 B1 | 5/2009 | Meichle et al. |
| 7,652,469 B2 | 1/2010 | Meyer |
| 7,705,585 B2 | 4/2010 | Howard |
| 7,906,958 B2 | 3/2011 | Nakayama et al. |
| 8,222,891 B2 | 7/2012 | Steinke et al. |
| 8,309,906 B2 | 11/2012 | Kapner et al. |
| 8,847,583 B2 | 9/2014 | Sasaki et al. |
| 8,928,311 B2 | 1/2015 | Sasaki |
| 9,267,819 B2 | 2/2016 | Cook |
| 9,383,184 B2 * | 7/2016 | Tiemann ................ G01B 7/30 |
| 9,435,663 B2 | 9/2016 | Cook |
| D774,928 S | 12/2016 | Matsumiya et al. |
| 9,612,136 B1 | 4/2017 | Cook |
| 9,618,366 B2 | 4/2017 | Nahum |
| 9,678,701 B2 | 6/2017 | Cook |
| 9,778,072 B1 | 10/2017 | Nahum |
| 9,833,802 B2 | 12/2017 | Kalistaja et al. |
| 9,835,473 B2 | 12/2017 | Nahum |
| 9,958,294 B2 | 5/2018 | Cook |
| 10,520,335 B2 | 12/2019 | Cook |
| 10,551,217 B2 | 2/2020 | Cook |
| 10,591,316 B2 | 3/2020 | Cook |
| 10,612,943 B2 | 4/2020 | Cook |
| 2001/0003422 A1 | 6/2001 | Andermo et al. |
| 2001/0020846 A1 | 9/2001 | Miyata |
| 2002/0030484 A1 | 3/2002 | Kiriyama et al. |
| 2002/0030485 A1 | 3/2002 | Gleixner |
| 2003/0090264 A1 | 5/2003 | Milvich |
| 2003/0128028 A1 | 7/2003 | Jordil |
| 2003/0160608 A1 | 8/2003 | Milvich |
| 2006/0103376 A1 | 5/2006 | Ma |
| 2009/0119940 A1 | 5/2009 | Meichle et al. |
| 2011/0254541 A1 | 10/2011 | Sasaki |
| 2012/0007591 A1 | 1/2012 | Howard et al. |
| 2014/0184202 A1 | 7/2014 | Horiguchi et al. |
| 2015/0375246 A1 | 12/2015 | Kalistaja et al. |
| 2016/0054154 A1 | 2/2016 | Cook |
| 2016/0146636 A1 | 5/2016 | Nahum |
| 2017/0089738 A1 | 3/2017 | Cook |
| 2017/0268905 A1 | 9/2017 | Nahum |
| 2017/0268906 A1 | 9/2017 | Nahum |
| 2018/0003524 A1 | 1/2018 | Cook |
| 2018/0058883 A1 | 3/2018 | Cook |
| 2018/0113004 A1 | 4/2018 | Cook |
| 2018/0180452 A1 | 6/2018 | Cook |
| 2018/0195880 A1 | 7/2018 | Cook |
| 2019/0120660 A1 | 4/2019 | Hitchman et al. |
| 2019/0301895 A1 | 10/2019 | Cook |
| 2020/0003581 A1 | 1/2020 | Cook et al. |
| 2020/0003583 A1 | 1/2020 | Cook |

FOREIGN PATENT DOCUMENTS

| | | |
|---|---|---|
| CN | 105415882 A | 3/2016 |
| EP | 1 014 041 A1 | 6/2000 |
| JP | 2018-0042628 A | 1/2018 |
| JP | 2018-031777 A | 3/2018 |
| JP | 2018-105854 A | 7/2018 |

* cited by examiner

*(Prior Art - US Pat. No. 10520335)*

(Prior Art - US Pat. No. 10520335) Fig.3.

TRANSMITTER AND RECEIVER CONFIGURATION FOR INDUCTIVE POSITION ENCODER

BACKGROUND

Technical Field

This disclosure relates to measurement instruments, and more particularly to inductive position encoders that may be utilized in precision measurement instruments.

Description of the Related Art

Various encoder configurations may include various types of optical, capacitive, magnetic, inductive, movement and/or position transducers. These transducers use various geometric configurations of a transmitter and a receiver in a read head to measure movement between the read head and a scale. Magnetic and inductive transducers are relatively robust to contamination, and are therefore desirable in many applications.

U.S. Pat. No. 6,011,389 (the '389 patent) describes an induced current position transducer usable in high accuracy applications, U.S. Pat. No. 5,973,494 (the '494 patent) and U.S. Pat. No. 6,002,250 (the '250 patent) describe incremental position inductive calipers and linear scales, including signal generating and processing circuits, and U.S. Pat. No. 5,886,519 (the '519 patent), U.S. Pat. No. 5,841,274 (the '274 patent), and U.S. Pat. No. 5,894,678 (the '678 patent) describe absolute position inductive calipers and electronic tape measures using an induced current transducer. U.S. Pat. No. 7,906,958 (the '958 patent) describes an induced current position transducer usable in high accuracy applications, wherein a scale having two parallel halves and a plurality of sets of transmitting coils and receiving coils mitigates certain signal offset components that may otherwise produce errors in an induced current position transducer. All of the foregoing are hereby incorporated herein by reference in their entireties. As described in these patents, an induced current transducer may be manufactured using printed circuit board technology and is largely immune to contamination.

However, such systems may be limited in their ability to provide certain combinations of features desired by users, such as combinations of signal strength, compact size, high resolution, cost, robustness to misalignment and contamination, etc. Configurations of encoders that provide improved combinations of these and other features would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An electronic position encoder is provided that is usable to measure a relative position between two elements along a measuring axis direction that coincides with an x-axis direction. In various implementations, the electronic position encoder includes a scale, a detector portion, and a signal processing configuration. The scale extends along the measuring axis direction and includes a signal modulating scale pattern comprising at least a first pattern track having a track width dimension along a y-axis direction that is perpendicular to the x-axis direction. In some embodiments, the signal modulating scale pattern includes the first pattern track and a second pattern track extending in the x-axis direction parallel to the first pattern track. Each pattern track comprises signal modulating elements that are arranged to provide a spatially varying characteristic which changes as a periodic function of position along the x-axis direction.

The detector portion is configured to be mounted proximate to the at least first pattern track and to move along the measuring axis direction relative to the at least first pattern track.

In various implementations, the detector portion includes a multi-layer circuit element (e.g., a printed circuit board or multi-layer circuit element) having a front surface that faces the scale during normal operation. A field generating coil configuration (a transmitter) is fixed on the multi-layer circuit element. The field generating coil configuration includes an input portion that connects it to a coil drive signal from a signal processing configuration, and a first-track field generating coil portion configured to nominally surround a first-track generated field area aligned with the first pattern track and generate a first-track changing magnetic flux in the first-track generated field area in response to the coil drive signal. The first-track field generating coil portion may be described as comprising first-track first-side and second-side elongated portions fabricated in one or more elongated portion layer of the multi-layer circuit element and extending along the x-axis direction proximate to first and second sides of the first-track generated field area, wherein the first-track first-side and second-side elongated portions collectively span or define a first-track elongated portion length dimension along the x-axis direction, and a y-axis direction separation between the first-track first-side and second-side elongated portions defines a nominal first-track generated field area width dimension. The first-track field generating coil portion further comprises a first-track shielded end section that is fabricated in a first-track shielded end section layer of the of the multi-layer circuit element and that spans the y-axis direction separation between the first-track first-side and second-side elongated portions and that is included in a conductor path that connects the first-track first-side and second-side elongated portions in the first-track field generating coil portion.

The detector portion includes at least one first-track shielded end configuration comprising the first-track shielded end section and a conductive shield region configuration comprising at least one first-track conductive shield region that extends along the x-axis and y-axis directions and that is fabricated in a first-track shield region layer that is located between the first-track shielded end section layer and one or more receiver loop layers of the multi-layer circuit element, with respect to their locations along a z-axis direction that is nominally normal to the front surface FS of the multi-layer circuit element. The detector portion further comprises a plurality of sensing elements comprising respective conductive receiver loops fabricated in the one or more receiver loop layers of the multi-layer circuit element, wherein the conductive receiver loops are distributed along the x-axis direction over a first-track sensing element area that is nominally aligned with the first pattern track. The sensing elements are configured to provide detector signals or detector signal contributions which respond to a local effect on the first-track changing magnetic flux provided by adjacent signal modulating elements of the scale pattern.

The signal processing configuration may be operably connected to the detector portion to provide the coil drive signal and is configured to determine the relative position between the detector portion and the scale pattern based on detector signals input from the detector portion.

In various implementations according to principles disclosed herein, the detector portion is configured as follows:

the first-track sensing element area extends over a first-track sensing element area length dimension along the x-axis direction and a first-track sensing element area width dimension along the y-axis direction, wherein the first-track sensing element area length dimension along the x-axis direction is longer than the first-track elongated portion length dimension;

the first-track shielded end section is configured such that its z-axis projection along the z-axis direction toward the receiver loop layers at least partially overlaps with the conductive receiver loops in the first-track sensing element area; and the first-track conductive shield region is configured in its first-track shield region layer such that it is interposed between the first-track shielded end section and the conductive receiver loops in the first-track sensing element area, and configured to intercept at least a majority of area of the z-axis projection of the first-track shielded end section that overlaps with the conductive receiver loops in the first-track sensing element area.

In some implementations, the at least one first-track conductive shield region is configured to intercept all of the area of the projection of the first-track shielded end section that overlaps with the receiver loops in the sensing element area, except where that at least one first-track conductive shield region includes insulating voids that surround conductive feedthroughs that extend generally along the z-axis direction and pass through that at least one first-track conductive shield region.

In some implementations, the at least one first-track conductive shield region is furthermore configured such that it intercepts at least a majority of area of a projection along the z-axis direction of the conductive receiver loops that are distributed in an end portion of first-track sensing element area that is located outside an end of the first-track elongated portion length dimension that corresponds to the location of the first-track shielded end section. In some such implementations, the at least one first-track conductive shield region is furthermore configured such that it intercepts all of the area of a projection along the z-axis direction of at least one conductive receiver loop that is distributed in a portion of first-track sensing element area that is located inside an end of the first-track elongated portion length dimension that corresponds to the location of the first-track shielded end section. In some such implementations, the at least one first-track conductive shield region is configured such that it intercepts all of the area of a projection along the z-axis direction of all of the conductive receiver loops that are distributed in the first-track sensing element area, except where that at least one first-track conductive shield region includes insulating voids that surround conductive feedthroughs that extend generally along the z-axis direction and pass through that at least one first-track conductive shield region.

In some implementations, the first-track sensing element area length dimension along the x-axis direction extends beyond the first-track elongated portion length dimension at each end by at least an amount SE that is at least K times the nominal first-track generated field area width dimension, where K is a number that is at least 1. In some implementations, K is a number that is at least 2. In some implementations, the signal modulating elements of the first pattern track are arranged corresponding to a spatial wavelength WL along the x-axis direction and SE is at least WL. In some such implementations, SE is at least 2*WL.

In some implementations, at least one elongated portion layer and at least one receiver loop layer are the same layer of the multi-layer circuit element, and at least one of the first-track elongated portions and at least some portions of the conductive receiver loops are fabricated in that same layer.

In some implementations, the multi-layer circuit element is a printed circuit board. In some such implementations, each connection between a first-track elongated portion and a first-track shielded end section comprises a printed circuit board feedthrough that extends along the z-axis direction.

In some implementations, the first track field generating coil portion is configured with a single turn configuration around the first-track generated field area, comprising a single first-track first-side elongated portion and single first track second-side elongated portion.

In some implementations, the first-track field generating coil portion is configured with a two turn configuration around the first-track generated field area, the two turn configuration comprising: a first first-side elongated portion connected in series to a first second-side elongated portion by a shielded end section in a shielded end section configuration at a first end; the first second-side elongated portion connected in series to a second first-side elongated portion by a shielded end section in a shielded end section configuration at a second end; and the second first-side elongated portion connected in series to a second second-side elongated portion by a shielded end section in a shielded end section configuration at the first end.

In some implementations of the electronic position encoder, the signal modulating scale pattern further includes a second pattern track arranged parallel to the first pattern track, and the first and second pattern tracks each include the signal modulating elements distributed along the x-axis direction. In such implementations, the field generating coil configuration includes a second-track field generating coil portion configured to nominally surround a second-track generated field area that is nominally aligned with the second pattern track and generate a second-track changing magnetic flux in the second-track generated field area in response to the coil drive signal. The second-track field generating coil portion may be described as comprising second-track first-side and second-side elongated portions fabricated in one or more elongated portion layer of the multi-layer circuit element and extending along the x-axis direction proximate to first and second sides of the second-track generated field area, wherein the second-track first-side and second-side elongated portions collectively span or define second-track elongated portion length dimension along the x-axis direction, and a y-axis direction separation between the second-track first-side and second-side elongated portions defines a nominal second-track generated field area width dimension. The second-track field generating coil portion further comprises a second-track shielded end section that is fabricated in a second-track shielded end section layer of the multi-layer circuit element, and that spans the y-axis direction separation between the second-track first-side and second-side elongated portions, and that is included in a conductor path that connects the second-track first-side and second-side elongated portions in the second-track field generating coil portion.

In such implementations, the detector portion further includes at least one second-track shielded end configuration comprising the second-track shielded end section and a conductive shield region configuration comprising at least one second-track conductive shield region that extends along the x-axis and y-axis directions and that is fabricated in a second-track shield region layer that is located between the second-track shielded end section layer and one or more receiver loop layers of the multi-layer circuit element, with respect to their locations along a z-axis direction that is nominally normal to the front surface of the multi-layer circuit element. In such implementations, in the plurality of sensing elements the conductive receiver loops are further distributed along the x-axis direction over a second-track sensing element area that is nominally aligned with the second pattern track, and the sensing elements are further configured to provide detector signals or detector signal contributions which respond to a local effect on the second-track changing magnetic flux provided by adjacent signal modulating elements of the scale pattern.

In various implementations wherein the signal modulating scale pattern includes the second pattern track as outlined above, according to principles disclosed herein the detector portion is configured as follows:

the second-track sensing element area extends over a second-track sensing element area length dimension along the x-axis direction and a second-track sensing element area width dimension along the y-axis direction, wherein the second-track sensing element area length dimension along the x-axis direction is longer than the second-track elongated portion length dimension;

the second-track shielded end section is configured such that its z-axis projection along the z-axis direction toward the receiver loop layers at least partially overlaps with the conductive receiver loops in the second-track sensing element area; and the second-track conductive shield region is configured in its second-track shield region layer such that it is interposed between the second-track shielded end section and the conductive receiver loops in the second-track sensing element area, and configured to intercept at least a majority of area of the z-axis projection of the second-track shielded end section that overlaps with the conductive receiver loops in the second-track sensing element area.

In some implementations, the first and second pattern tracks each include the same type of signal modulating elements that are arranged according to a same spatial period or wavelength WL along the x-axis direction in the first and second pattern tracks. The signal modulating elements in the second pattern track may be offset along the measuring axis direction by a nominal scale track offset of approximately WL/2 relative to the signal modulating elements in the first pattern track. In some such implementations, the field generating coil configuration may be configured to generate the first-track changing magnetic flux with a first polarity in the first-track generated field area, and generate the second-track changing magnetic flux with a second polarity that is opposite to the first polarity in the second-track generated field area, and at least a majority of the conductive receiver loops are configured to extend along the y-axis direction into both the first-track and second-track sensing element areas and provide the same sensing loop polarity in the first-track and second-track sensing element areas. In other such implementations, the field generating coil configuration may be configured to generate the first-track changing magnetic flux with a first polarity in the first-track generated field area, and generate the second-track changing magnetic flux with a polarity that is the same as the first polarity in the second-track generated field area, and at least a majority of the conductive receiver loops are configured to extend along the y-axis direction into both the first-track and second-track sensing element areas and include a cross over or twisting of their conductive traces to provide opposite sensing loop polarities in the first-track and second-track sensing element areas. In some such implementations, for at least a majority of the conductive receiver loops, the cross over or twisting of their conductive traces is located in a region including a first-track elongated portion and a second-track elongated portion between the first-track generated field area and the second-track generated field area.

In some implementations of the "two-track" electronic position encoder outlined above, the first-track field generating coil portion and the second-track field generating coil portion are each configured with a single turn configuration around their respective first-track generated field area and second-track generated field area. In some implementations, the first-track shielded end section layer and the second-track shielded end section layer are the same layer. In some implementations, the first-track shield region layer and the second track shield region layer are the same layer. In some implementations, the first-track first and second elongated portions and the second-track first and second elongated portions are fabricated in the same one or more elongated portion layers.

DETAILED DESCRIPTION

Figure 1:
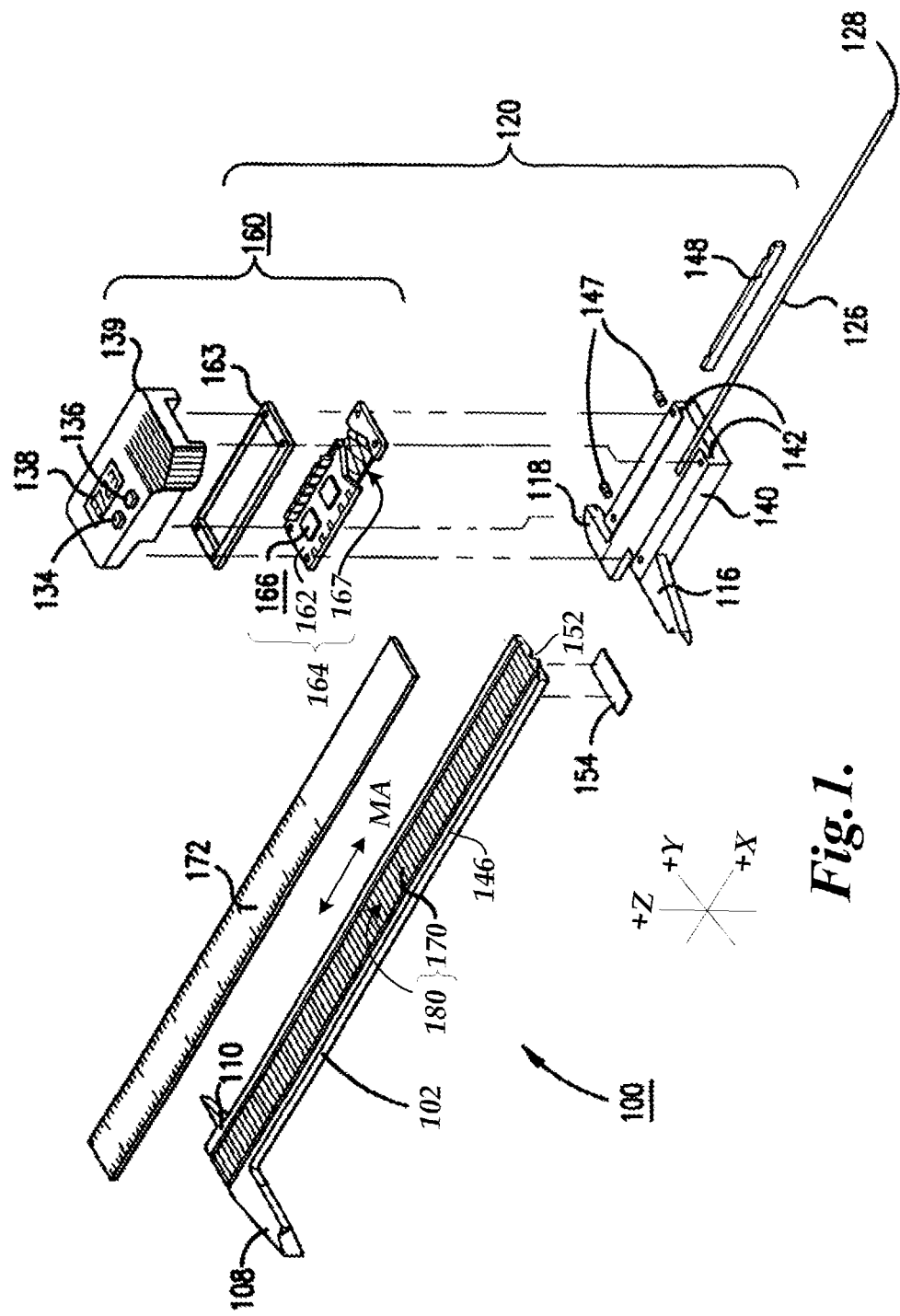
FIG. 1 is an exploded isometric view diagram of a hand tool type caliper utilizing an electronic position encoder including a detector portion and a scale.

FIG. 1 is an exploded isometric view diagram of a hand tool type caliper 100 which may utilize an electronic position encoder including a known detector portion 167 and scale pattern 180, or a novel detector portion 167 and scale pattern 180 according to principles disclosed herein. In the illustrated implementation, the caliper 100 includes a scale member 102 having a spar of roughly rectangular cross-section including a scale 170, and slider assembly 120. In various implementations, the scale 170 may extend along a measuring axis direction MA corresponding to an x-axis direction and may include a signal modulating scale pattern 180. A known type of cover layer 172 (e.g., 100 µm thick) may cover the scale 170. Jaws 108 and 110 near a first end of the scale member 102 and movable jaws 116 and 118 on the slider assembly 120 are used to measure dimensions of objects in a known manner. The slider assembly 120 may optionally include a depth bar 126, restrained in a depth bar groove 152 under the scale member 102, by an end stop 154. The depth bar engagement end 128 may extend into a hole to measure its depth. A cover 139 of the slider assembly 120 may include an on/off switch 134, a zero-setting switch 136 and a measurement display 138. A base 140 of the slider assembly 120 includes a guiding edge 142 which contacts a side edge 146 of the scale member 102, and screws 147 bias a resilient pressure bar 148 against a mating edge of the scale member 102 to ensure proper alignment for measuring, and for moving a read head portion 164 relative to the scale 170.

A pickoff assembly 160 mounted on the base 140 holds the read head portion 164 which, in this implementation, includes a multi-layer circuit element 162 (e.g., a printed circuit board or PCB) that carries a detector portion 167 including a field generating coil configuration and a group of sensing elements (e.g., collectively, a field generating and sensing winding configuration) arranged along the measuring axis direction MA, and a signal processing configuration 166 (e.g., a control circuit). A resilient seal 163 may be compressed between the cover 139 and the multi-layer circuit element 162 to exclude contamination from the circuitry and connections. The detector portion 167 may be covered by an insulative coating.

In one specific illustrative example, the detector portion 167 may be arranged parallel with and facing the scale 170, and a front face or surface of the detector portion 167 that faces the scale 170 may be separated from the scale 170 (and/or the scale pattern 180) by a gap on the order of 0.5 mm along the depth (Z) direction. Together, the read head portion 164 and the scale 170 may form a transducer as part of an electronic position encoder. In one implementation, the transducer may be an eddy current or inductive type transducer which operates by generating changing magnetic fields, wherein the changing magnetic fields induce circulating currents, known as eddy currents, in some of the signal modulating elements of the scale pattern 180 that are placed within the changing magnetic field, as will be described in more detail below. It will be appreciated that the caliper 100 shown in FIG. 1 is one of various applications that typically implement an electronic position encoder that has evolved over a number of years to provide a relatively optimized combination of compact size, low power operation (e.g., for long battery life), high resolution and high accuracy measurement, low cost, robustness to contamination, etc. Even small improvements in any of these factors and/or the signal to noise ratio (S/N) achievable in the position encoder are highly desirable, but difficult to achieve, especially in light of the design constraints imposed in order to achieve commercial success in the various applications. The principles disclosed in the following description provide improvements in a number of these factors in a particularly cost effective and compact manner.

Figure 2:
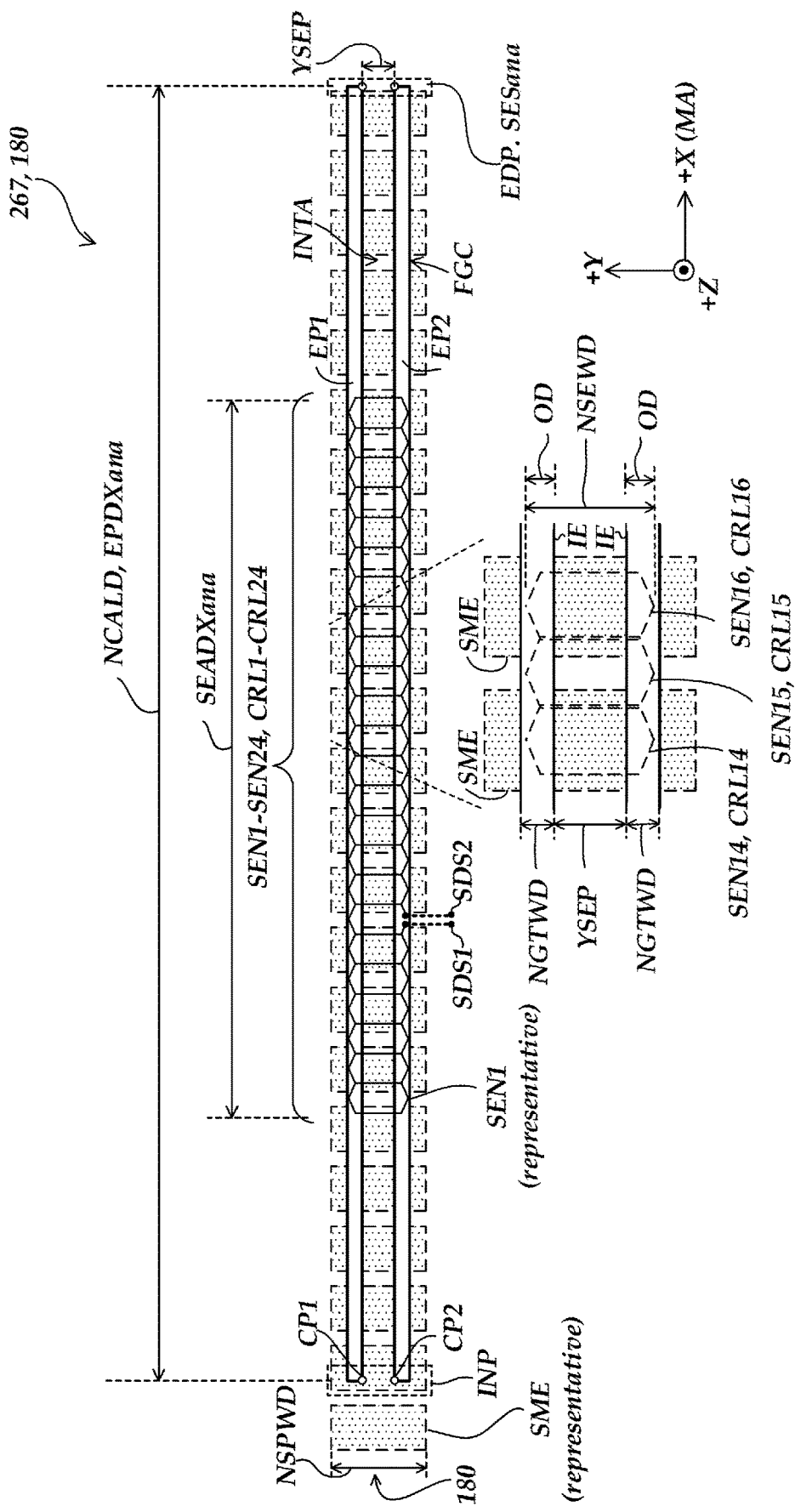
FIG. 2 is a plan view diagram illustrating a prior art implementation of a detector portion usable in an electronic position encoder.
Figure 3:
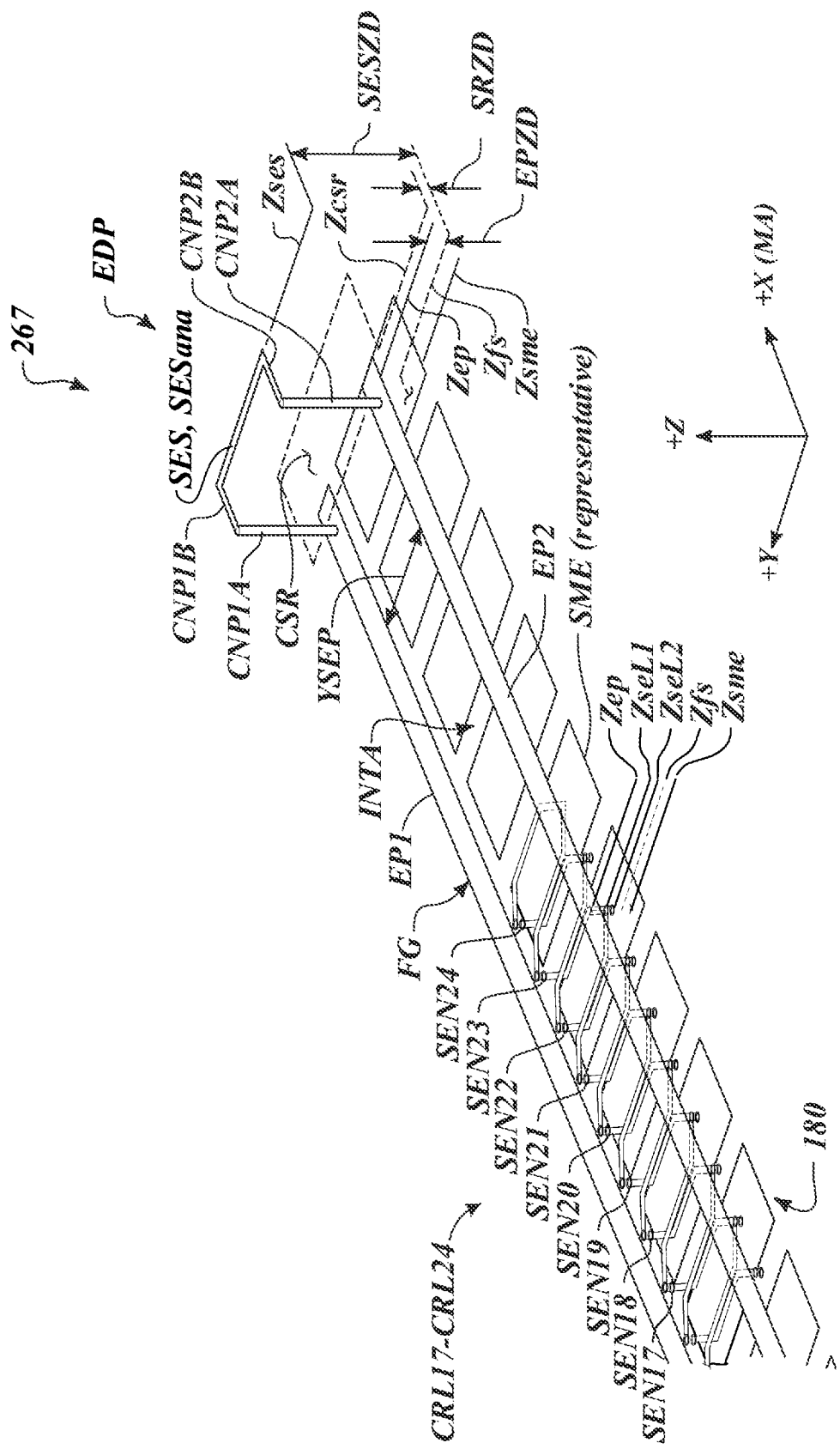
FIG. 3 is an isometric view diagram generally corresponding to FIG. 2 illustrating a prior art implementation of an end portion of a field generating coil configuration of a detector portion, in which the relative placement of field generating elongated portions and conductive receiver loops in the detector portion is more clearly illustrated.

FIG. 2 and FIG. 3 are respective plan view and isometric view diagrams illustrating a known prior art implementation of a detector portion 267 and scale pattern 180 usable as the detector portion 167 and the signal modulating scale pattern 180 in the electronic position encoder shown in FIG. 1, or the like. Only certain features of FIG. 2 and FIG. 3 are described in detail below, insofar as that description provides pertinent background and explanation applicable to the understanding of certain analogous features and operations of the novel electronic position encoders and detector portions described further below with reference to FIGS. 4-9. Additional detail useful in understanding the implementations shown in FIGS. 2 and 3 may be found in commonly assigned U.S. patent Ser. No. 10/520,335 (the '335 patent), which is hereby incorporated by reference in its entirety.

FIG. 2 is a plan view diagram illustrating a known prior art implementation of a detector portion 267 and scale pattern 180. FIG. 2 may be regarded as partly representational, partly schematic. An enlarged section of the detector portion 267 and scale pattern 180 is illustrated in the lower portion of FIG. 2. In FIG. 2, the various elements described below are represented by their shape or outline, and are shown superimposed on one another to emphasize certain geometric relationships. It should be understood that various elements may reside on different fabrication layers located at different planes along the z-axis direction, as needed to provide various operating gaps and/or insulating layers, as will be apparent to one of ordinary skill in the art based on generally known design practices and/or as outlined in the following description, and/or in the description further below (with reference to FIG. 3, for example.) In the particular embodiment illustrated in FIGS. 2 and 3, elongated portions EP1 and EP2 of the field generating coil configuration FGC overlap with the conductive receiver loops SEN1-SEN24 and are therefore fabricated using a set of elongated portion metal layers including at least a first interior metal layer of a multi-layer circuit element, and conductive receiver loops SEN1-SEN24 are fabricated using a set of receiver loop metal layers of the multi-layer circuit element that include at least one metal layer that is closer than the first interior metal layer to a front surface of the detector portion that faces the scale pattern 180. With reference to this subject matter, the enlarged section of the detector portion 267 of FIG. 2 illustrates two edges of each of the conductive receiver loops SEN14-SEN16, which overlap with the elongated portions EP1 and EP2, in broken lines to indicate that the conductive receiver loops are closer than the elongated portions to the front surface of the detector portion. (See also, FIG. 3.) On the other hand, the main view of the detector portion 267 of FIG. 2 illustrates two edges of each of the conductive receiver loops SEN1-SEN24 in solid lines, for ease of illustration only. Throughout the figures of this disclosure, it will be appreciated that the x-axis, y-axis and/or z-axis dimensions of one or more elements may be exaggerated for clarity.

The illustrated portion of the scale pattern 180 includes signal modulating elements SME shown in dashed outline, which are located on the scale 170 (shown in FIG. 1). The y-direction extremes of most of the signal modulating elements SME are hidden below the first and second elongated portions EP1 and EP2 in the embodiment illustrated in FIG. 2. It will be appreciated that the scale pattern 180 moves relative to the detector portion 267 during operation, as may be seen in FIG. 1.

In the example of FIG. 2, the scale pattern 180 has a nominal scale pattern width dimension NSPWD along a y-axis direction that is perpendicular to the x-axis, and comprises discrete signal modulating elements SME that are arranged periodically along the measuring axis direction MA (e.g., corresponding to an x-axis direction). However, more generally, the scale pattern 180 may comprise various alternative spatially modulated patterns including discrete elements, or one or more continuous pattern element(s), provided that the pattern has a spatial characteristic which changes as a function of position along the x-axis direction, so as to provide position dependent detector signals (also referred to as detector signal components, in some embodiments) arising in the sensing elements SEN (e.g., SEN14) of the detector portion 267, according to known methods.

In various implementations, the detector portion 267 is configured to be mounted proximate to the scale pattern 180, and to move along the measuring axis direction MA relative to the scale pattern 180. The detector portion includes a field generating coil configuration FGC and a plurality of sensing elements SEN, which may take a variety of alternative configurations to be used in combination with a variety of corresponding signal processing schemes in various embodiments, as will be understood by one skilled in the art based on the following disclosure. FIG. 2 shows a single representative set of sensing elements SEN1-SEN24, which in this particular embodiment comprise conductive receiver loops CRL1-CRL24 (alternatively referred to as sensing loop elements, sensing coil elements or sensing winding elements) which are connected in series. In this embodiment, adjacent loop elements are connected by a configuration of conductors on various layers of the multi-layer circuit element (e.g., as connected by feedthroughs) according to known methods such that they have opposite winding polarities. That is, if a first loop responds to a changing magnetic field with a positive polarity detector signal contribution, then the adjacent loops respond with a negative polarity detector signal contribution. In this particular embodiment, the sensing elements are connected in series such that their detector signals or signal contributions are summed, and a "summed" detector signal is output at the detector signal output connections SDS1 and SDS2 to a signal processing configuration (not shown). Although FIG. 2 shows a single set of sensing elements to avoid visual confusion, it will be appreciated that in various embodiments it is advantageous to configure the detector to provide one or more additional sets of sensing elements at a different spatial phase position (e.g., to provide quadrature signals), as will be understood by one of ordinary skill in the art. It should be appreciated that the configurations of sensing elements described herein are exemplary only, and not limiting. As one example, individual sensing element loops may output individual signals to a corresponding signal processing configuration in some embodiments, for example, as disclosed in commonly assigned U.S. Pat. App. Pub. No. 2018/003524, which is hereby incorporated by reference in its entirety. More generally, various known sensing element configurations may be used in combination with the principles disclosed and claimed herein, for use in combination with various known scale pattern and signal processing schemes, in various embodiments.

The various sensing elements and the field generating coil configuration FGC may be fixed on a substrate (e.g., multi-layer circuit element 162 of FIG. 1). The field generating coil configuration FGC may be described as surrounding an interior area INTA having a nominal coil area length dimension NCALD along the x-axis direction and a nominal coil area width dimension of approximately YSEP along the y-axis direction. In various implementations, the field generating coil configuration FGC may comprise a single turn surrounding the interior area INTA. In operation, the field generating coil configuration FGC generates a changing magnetic flux in the interior area INTA in response to a coil drive signal.

In various implementations, the field generating coil configuration FGC may include an input portion INP, first and second elongated portions EP1 and EP2, and an end portion EDP (e.g., implemented as disclosed with reference to FIG. 3). The input portion INP includes first and second connection portions CP1 and CP2 that connect a coil drive signal from a signal processing configuration (e.g., the signal processing configuration 166 of FIG. 1, or the signal processing configuration 966 of FIG. 9, etc.) to the field generating coil configuration FGC. The first and second connection portions CP1 and CP2 may be connected to the signal processing configuration through printed circuit board feedthroughs or the like, and the connections may also be shielded utilizing principles analogous to those disclosed below with reference to the end portion EDP, in some embodiments. The first and second elongated portions EP1 and EP2 each extend along the x-axis direction adjacent or proximate to a side of the interior area INTA, and have a nominal generating trace width dimension NGTWD along the y-axis direction. In the illustrated embodiment, the nominal generating trace width dimensions NGTWD are the same for the first and second elongated portions EP1 and EP2, but this is not a requirement in all embodiments. The end portion EDP (e.g., implemented as disclosed with reference to FIG. 3) spans the y-axis direction separation corresponding to the nominal coil width dimension YSEP between the first and second elongated portions EP1 and EP2 to provide a connection therebetween near an end of the interior area INTA. In the known implementation shown in FIGS. 2 and 3, the field generating coil configuration FGC is advantageously configured using a design ratio wherein each nominal generating trace width dimension NGTWD may be at least 0.1 times, or 0.15 times, or 0.25 times the nominal coil area width dimension YSEP, and/or at least 25 times the skin depth of the elongated portions EP1 and EP2 in order to minimize the impedance of the field generating coil configuration FGC at a nominal operating frequency defined corresponding to detector signals that arise in response to the changing magnetic flux. However, despite its utility in various known implementations, it should be appreciated that this design ratio is not required in various novel implementations disclosed herein which may minimize the impedance of the field generating coil configuration FGC by other means.

The sensing elements SEN1-SEN24 are arranged along the x-axis direction (e.g., corresponding to the measuring axis direction MA) and are fixed on the substrate (e.g., multi-layer circuit element 162 of FIG. 1). In the example of FIG. 2, each of the sensing elements SEN has a nominal sensing element width dimension NSEWD along the y-axis direction, wherein at least a majority of the nominal sensing element width dimension NSEWD is included within the nominal coil area width dimension YSEP along the y-axis direction. The sensing elements SEN are configured to provide detector signals which respond to a local effect on the changing magnetic flux provided by an adjacent signal modulating portion of the scale pattern 180 (e.g., one or more signal modulating elements SME) of the scale 170. A signal processing configuration (e.g., the signal processing configuration 166 of FIG. 1, or the signal processing configuration 966 of FIG. 9, etc.) may be configured to determine a position of the plurality of sensing elements SEN1-SEN24 relative to the scale pattern 180 (or the scale 170) based on the detector signals input from the detector portion 267. In general, the field generating coil configuration FGC and the sensing elements SEN1-SEN24, or the like, may operate according to known principles (e.g., for inductive encoders), such as those described in the incorporated references.

In various implementations, the field generating coil configuration FGC and the sensing elements SEN are insulated from one another. In some implementations, they are located in different metal layers separated by insulating layers in a multi-layer circuit element, as previously described. Such is the case in the known implementation illustrated in FIGS. 2 and 3, wherein the nominal sensing element width dimension NSEWD of at least one sensing element SEN is advantageously greater than the nominal coil area width dimension YSEP between the elongated portions EP1 and EP2 and extends beyond an interior edge IE of at least one of the elongated portions EP1 or EP2 by an amount defined as an overlap dimension OD. In addition, the field generating coil configuration FGC may be advantageously configured such that each nominal generating trace width dimension NGTWD is larger than the corresponding overlap dimension OD, in various embodiments. These and other features described above for the known implementation illustrated in FIGS. 2 and 3 are generally selected to optimize the impedances and signal coupling in the detector portion 267, in order to maximize its S/N ratio and/or accuracy. However, despite their utility in various known implementations, it should be appreciated that these design features are not necessarily required in various novel implementations according to principles disclosed here. These novel implementations may achieve equal or better impedances and signal coupling by other means, as disclosed with reference to FIGS. 4-8, in order to equal or better S/N ratios and/or accuracy.

As described above with respect to FIG. 1, in various implementations the detector portion 267 may be included in various types of measurement instruments (e.g., calipers, micrometers, gauges, linear scales, etc.). For example, the detector portion 267 may be fixed to a slide member, and the scale pattern 180 may be fixed to a beam member having a measuring axis that coincides with an x-axis direction. In such a configuration, the slide member may be movably mounted on the beam member and movable along the measuring axis direction MA in a plane that extends along the x-axis direction and a y-axis direction, with a z-axis direction being orthogonal to the plane.

FIG. 3 is an isometric view "wire frame" diagram generally corresponding to FIG. 2 and illustrating a prior art implementation of an end portion EDP of a field generating coil configuration FGC usable in the detector portion 267, in which the relative placement of the elongated portions EP1 and EP2 and the end portion EDP of the field generating coil configuration FGC and the conductive receiver loops SEN in the detector portion 267 are more clearly illustrated. It will be appreciated that the elements of the detector portion 267 of FIG. 3 may be similar or identical to the similarly numbered elements of the detector portion 267 of FIG. 2 and may be generally understood by analogy thereto.

The detector portion 267 is shown to include the field generating coil configuration FGC and the plurality of sensing elements SEN1-SEN24 (representative sensing elements SEN17-SEN24 comprising conductive receiver loops CRL14-CRL24 are illustrated in FIG. 3). The field generating coil configuration FGC includes the first and second elongated portions EP1 and EP2 and the end portion EDP and is fixed on a multi-layer circuit element 162 (e.g., the multi-layer circuit element 162 shown in FIG. 1) and nominally surrounds the interior area INTA.

In various implementations, the field generating coil configuration FGC and the sensing elements SEN are insulated from one another, e.g., as located in different conductive layers of a printed circuit board that are separated by intervening insulating layers, as previously outlined. In the particular implementation shown in FIG. 3, the elongated portions EP1 and EP2 of the field generating coil configuration FGC are fabricated using a set of elongated portion metal or conductive layers including at least a first interior metal layer (at a Z coordinate Zep in FIG. 3) of the multi-layer circuit element, and conductive receiver loops SEN1-SEN24 are fabricated using a set of receiver loop metal layers of the multi-layer circuit element that include two metal layers (at a Z coordinates ZseL1 or ZseL2) that are closer than the first interior metal layer (at Zep) to a front surface of the detector portion (at a Z coordinate Zfs) that faces the scale pattern 180. In FIG. 3, the various labeled Z coordinates may be understood to coincide with, or identify, respective surfaces of various multi-layer circuit element layers. In various embodiments, the multi-layer circuit element may comprise a PCB, a thick film hybrid circuit, a thin film circuit, or other alternative fabrication methods may be used according to known methods. The signal modulating elements SME of the scale pattern 180 reside on a surface of the scale 170 (shown in FIG. 1), at a Z coordinate Zsme. It will be understood that the scale 170 is separate from the multi-layer circuit element that carries the detector portion 267. As described above, the multi-layer circuit element (the detector portion 267) has a front surface (e.g., a front surface of an insulative coating) located at Z coordinate Zfs. An operating gap exists between the scale surface Z coordinate Zsme and the front surface Z coordinate Zfs. The sensing elements SEN comprise interconnected conductive receiver loops fabricated using a set of receiver loop metal layers of the multi-layer circuit element that include at least one metal layer at Z coordinate ZseL1 or ZseL2. The conductive receiver loops may be connected between the layers (at Z coordinates ZseL1 and ZseL2) using known types of conductive feedthroughs through insulating layers which generally separate the metal layers according to known methods, such that conductive portions of the conductive receiver loops may cross over one another while connecting the sensing elements signal contributions in a serial manner and providing respective signal contribution polarities, as will be more fully described below.

In the particular implementation shown in FIG. 3, the first and second elongated portions EP1 and EP2 each extend along the x-axis direction and are nominally located at the elongated portion z distance EPZD=(Zep−Zfs) from the front surface (Zfs) of the multi-layer circuit element of the detector portion 267 that faces the scale pattern 180, along a z-axis direction that is perpendicular to the x-axis and y-axis directions. In some implementations, the conductive receiver loops include planar trace loop portions formed in respective layers included in the set of receiver loop metal layers (at ZseL1 and ZseL2), and feedthrough portions including plated holes that connect the planar trace portions between their respective layers. In the illustrated implementation, the planar trace portions are fabricated in respective layers (at ZseL1 and ZseL2) that are closer to the front surface of the detector portion (at Zfs) than the first interior metal layer (at Zep). In some implementations, at least some of the planar trace portions of the conductive receiver loops may be fabricated in a respective layer (at ZseL1 or ZseL2) that is a metal layer located on the front surface of the detector portion (at Zfs) or that is closest to the front surface of the detector portion.

As outlined previously, the end portion EDP comprises a conductive path that spans a y-axis direction separation corresponding to the nominal coil area width dimension YSEP between the first and second elongated portions EP1 and EP2 to provide a connection therebetween near an end of the interior area INTA. In the implementation shown in FIG. 3, the end portion EDP includes a shielded end section SES that resides on a respective multi-layer circuit element layer having a Z coordinate Zses, which is nominally located at a shielded end section z distance SESZD=(Zses-Zfs) from the front surface (Zfs) of the multi-layer circuit element of the detector portion 267, wherein the shielded end section z distance SESZD is greater than the elongated portion z distance EPZD. In the particular implementation shown in FIG. 3 the shielded end section SES is offset along the x-axis direction from the ends of the elongated portions EP1 and EP2, and a first connection portion CNP1 (e.g., comprising a multi-layer circuit element feedthrough CNP1A and a conductive trace CNP1B) connects the first elongated portion EP1 to a first end of the shielded end section SES, and a second connection portion CNP2 (e.g., comprising a multi-layer circuit element feedthrough CNP2A and a conductive trace CNP2B) connects the second elongated portion EP2 to a second end of the shielded end section SES. In an alternative implementation (not shown in FIG. 3) the shielded end section SES need not be significantly offset along the x-axis direction from the ends of the elongated portions EP1 and EP2, and the conductive traces CNP1B and CNP2B may be omitted. That is, the multi-layer circuit element feedthrough CNP1A may connect the first elongated portion EP1 to a first end of the "non-offset" shielded end section SES, and the multi-layer circuit element feedthrough CNP2A may connect the second elongated portion EP2 to a second end of the "non-offset" shielded end section.

In either implementation of the end portion EDP outlined above, the detector portion 267 further includes a conductive shield region CSR (e.g., a conductive plane region represented by somewhat arbitrarily placed dashed "edge" lines in FIG. 3), extending along the x-axis and y-axis directions and nominally located on a respective multi-layer circuit element layer surface having a Z coordinate Zcsr, which is nominally located at a shield region z distance SRZD=(Zcsr-Zfs) from the front surface of the multi-layer circuit element of the detector portion 267. In various implementations, the shield region z distance SRZD is smaller than the shielded end section z distance SESZD, and the conductive shield region CSR is located between at least part of the shielded end section SES and the front surface (Zfs) of the multi-layer circuit element of the detector portion 267. The conductive shield region CSR may comprise a portion of an extensive ground plane layer in the multi-layer circuit element of the detector portion 267, or it may comprise a discrete region in some embodiments. The conductive shield region CSR may include clearance holes such that the first and second connection portion CNP1 and CNP2 (e.g., multi-layer circuit element feedthroughs) are separated from or insulated from the conductive shield region CSR.

As taught in the '335 patent, prior to the use of a shielded end section configuration according to the principles outlined above with reference to FIG. 3, field components generated by the end portions of field generating coil configurations (e.g., end portions that extend along the y-axis direction) have caused error components to arise in the detector signals of the sensing elements closest to them—a so-called "end effect". It has been attempted to mitigate this end effect using "tapered end configurations" in the detector, and/or by spacing the field generating coil end portions far from the end sensing elements. However, these approaches undesirably reduce signal strength, or increase the detector x-axis dimension, or both. In contrast, the shielded end section configuration outlined above, with reference to FIG. 3, tends to reduce the field component generated by an end portion and/or prevent it from reaching the signal modulating elements SME. As such, the field component that is coupled to the closest sensing elements is smaller and/or approximately constant regardless of the scale position, thus substantially mitigating any end effect. The '335 patent further summarizes that a shielded end section configuration, such as that outlined above with reference to FIG. 3, uses a conductive shield region(s) CSR to reduce the effect (e.g., related to the changing magnetic flux) of the shielded end section SES on the sensing elements SEN, which may allow a shorter overall x-axis dimension for the field generating coil configuration FGC (or detector portion 267), for which the end portion EDP does not need to be located as far away from the sensing elements SEN in order to avoid influencing the detector signals that arise in response to the changing magnetic flux, etc.

However, while the '335 patent (which is commonly assigned with this application) suggests that an end portion of a field generating coil configuration FGC need not be located as far away from the sensing elements SEN relative to previous conventional configurations, it still discloses and teaches only configurations that include some separation between the end portion EDP of a field generating coil configuration FGC and the nearest sensing element SEN. In particular, the '335 patent does not recognize or suggest that an end portion EDP or a shielded end section SES may be located proximate to or overlap with any sensing element SEN. In contrast, the inventor has discovered configurations in which it is advantageous for an end portion EDP or a shielded end section SES to be located proximate to and/or overlapping with a sensing element SEN. Or stated another way, the inventor has discovered configurations in which it is advantageous for the field generating coil configuration FGC to be substantially shorter than previously known configurations, and for the plurality of sensing elements SEN to extend beyond the end portion EDP or a shielded end section SES of the field generating coil configuration FGC, along the x-axis direction. Various features and alternatives usable in such configurations are disclosed below with reference to FIGS. 4-8.

Figure 4:
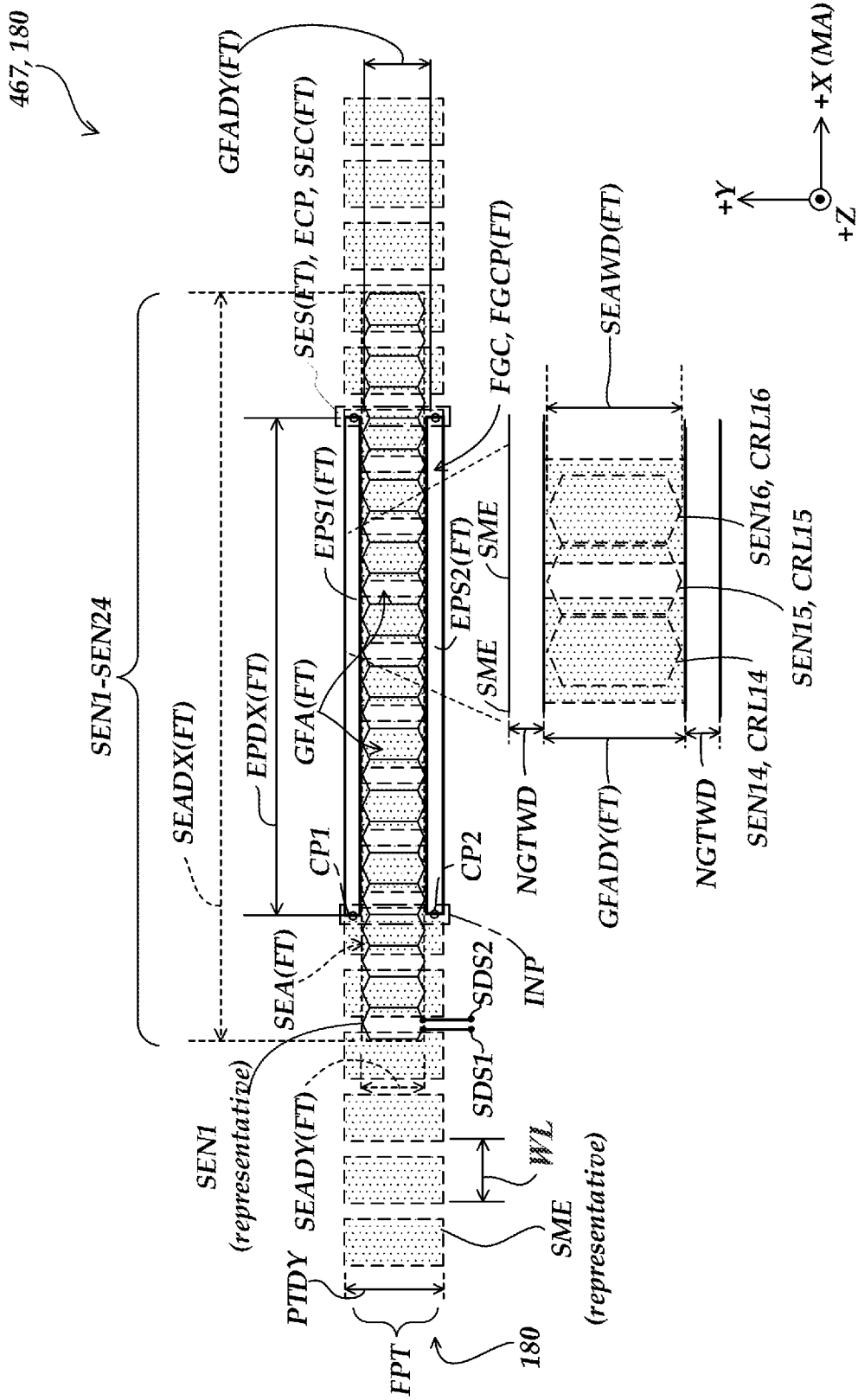
FIG. 4 is a plan view diagram illustrating a first exemplary implementation of a detector portion according to principles disclosed herein and a compatible scale pattern usable in an electronic position encoder.
Figure 5:
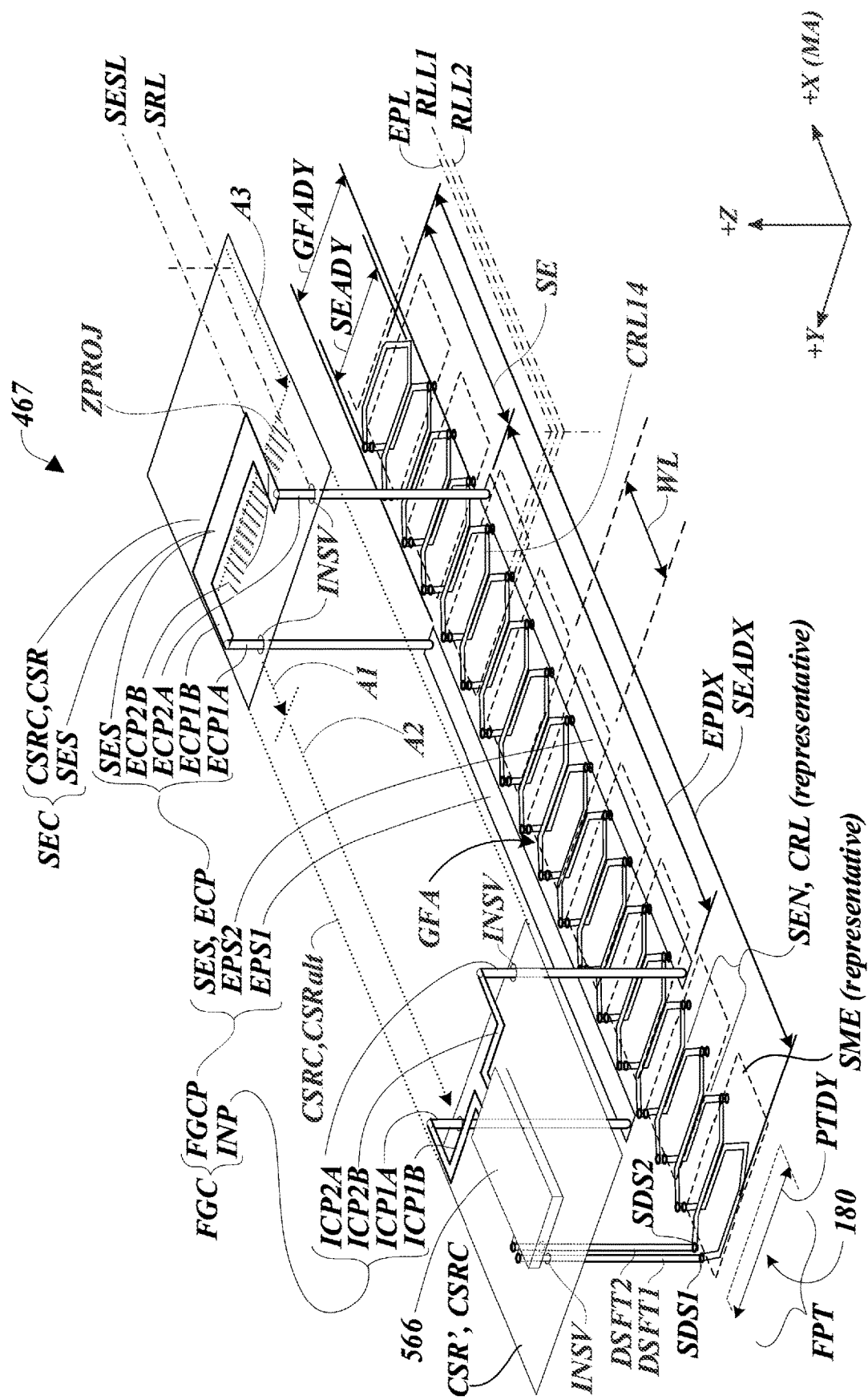
FIG. 5 is an isometric view diagram illustrating the first exemplary implementation generally corresponding to FIG. 4, in which the relative placement of field generating elongated portions and conductive receiver loops in the detector portion is more clearly illustrated.

FIG. 4 and FIG. 5 are respective plan view and isometric view diagrams illustrating a first implementation of a detector portion 467 according to principles disclosed and claimed herein, and a compatible scale pattern 180, usable as the detector portion 167 and the signal modulating scale pattern 180 in the electronic position encoder shown in FIG. 1, or the like. The detector portion 467 has certain characteristics and components similar to the detector portion 267 of FIGS. 2 and 3. In particular, elements designated by similar reference numbers in FIGS. 4 and 2 or in FIGS. 5 and 3 (e.g., similar names or numerals or numerical "suffixes"), or elements that are otherwise obviously similar elements in various figures, are analogous elements, and may be understood to operate similarly, except as otherwise indicated below. Only certain features of FIG. 4 and FIG. 5 are described in detail below, insofar as that description is intended to emphasize novel features and/or benefits according to principles disclosed and claimed herein, and the figures may otherwise be understood by analogy to other figures and description included herein, or in the incorporated references, by one of ordinary skill in the art.

FIG. 4 is a plan view diagram illustrating a first exemplary implementation of a detector portion 467 and a compatible scale pattern 180 usable in an electronic position encoder. FIG. 4 may be regarded as partly representational, partly schematic. As previously indicated, throughout the figures of this disclosure, it will be appreciated that the x-axis, y-axis and/or z-axis dimensions of one or more elements may be exaggerated for clarity. An enlarged section of the detector portion 467 and scale pattern 180 is illustrated in the lower portion of FIG. 4. In FIG. 4, the various elements described below are represented by their shape or outline and are shown superimposed on one another to emphasize certain geometric relationships. It should be understood that various elements may reside on different fabrication layers located at different planes along the z-axis direction, as needed to provide various operating gaps and/or insulating layers, as will be apparent to one of ordinary skill in the art based on generally known design practices and/or as outlined in the following description, and/or in the description further below (with reference to FIG. 5, for example.)

As shown in FIGS. 4 and 5, the signal modulating scale pattern 180 includes a first pattern track FPT having a pattern track width dimension PTDY along a y-axis direction that is perpendicular to the x-axis direction. The first pattern track includes signal modulating elements SME that are arranged to provide a spatially varying characteristic which changes as a periodic function of position along the x-axis direction. The detector portion 467 is configured to be mounted proximate to the first pattern track FPT and to move along the measuring axis direction MA relative to the first pattern track FPT. The detector portion 467 includes a multi-layer circuit element (e.g., as previously outlined herein) having a front surface that faces the scale that carries the scale pattern 180 during normal operation. The detector portion 467 comprises a field generating coil configuration FGC that is fixed on the multi-layer circuit element, as well as at least one first-track shielded end configuration SEC (FT), and a plurality of sensing elements SEN, as described in greater detail below.

As shown in FIG. 4, the field generating coil configuration FGC comprises an input portion INP including at least two connection portions CP1, CP2 that connect the field generating coil configuration to a coil drive signal from a signal processing configuration (e.g., the signal processing configuration 166 of FIG. 1 or 966 of FIG. 9), and a first-track field generating coil portion FGCP(FT) configured to nominally surround a first-track generated field area GFA(FT) that is nominally aligned with the first pattern track FPT and generate a first-track changing magnetic flux in the first-track generated field area GFA(FT) in response to the coil drive signal. The first-track field generating coil portion FGCP(FT) illustrated in FIG. 4 comprises the first-track first-side elongated portion EPS1(FT) and first-track second-side elongated portion EPS2(FT), which are fabricated in one or more elongated portion layer EPL of the multi-layer circuit element (e.g., as shown in FIG. 5) and extend along the x-axis direction proximate to first and second sides S1, S2 of the first-track generated field area GFA(FT). The first-track first-side and second-side elongated portions EPS1(FT) and EPS2(FT) collectively span or define a first-track elongated portion length dimension EPDX along the x-axis direction, and a y-axis direction separation between the first-track first-side and second-side elongated portions EPS1(FT) and EPS2(FT) defines a nominal first-track generated field area width dimension GFADY(FT). The first-track field generating coil portion FGCP(FT) further comprises a first-track shielded end section SES(FT) that is fabricated in a first-track shielded end section layer SESL (FT) of the multi-layer circuit element (e.g., as shown in FIG. 5) and that spans the y-axis direction separation between the first-track first-side and second-side elongated portions EPS1(FT) and EPS2(FT) and that is included in an end conductor path ECP that connects the first-track first-side and second-side elongated portions EPS1(FT) and EPS2(FT) in the first-track field generating coil portion FGCP(FT).

The first-track shielded end configuration SEC(FT) comprises the first-track shielded end section SES(FT) outlined above as well as a first-track conductive shield region CSR(FT) (e.g., as shown in FIG. 5). As described in greater detail below with reference to FIG. 5, the conductive shield region CSR(FT) is included in a conductive shield region configuration CSRC, and extends along the x-axis and y-axis directions, and is fabricated in a first-track shield region layer SRL(FT) that is located between the first-track shielded end section layer SESL(FT) and one or more receiver loop layers RLL (e.g., RLL1 and RLL2) of the multi-layer circuit element, with respect to their locations along a z-axis direction that is nominally normal to the front surface of the multi-layer circuit element.

As shown in FIG. 4, the plurality of sensing elements SEN (e.g., SEN1-SEN24) comprise respective conductive receiver loops CRL (e.g., CRL1-CRL24) fabricated in the one or more receiver loop layers RLL (e.g., RLL1 and RLL2 as shown in FIG. 5) of the multi-layer circuit element, wherein the conductive receiver loops CRL are distributed along the x-axis direction over a first-track sensing element area SEA(FT) that is nominally aligned with the first pattern track FPT. The sensing elements SEN are configured to provide detector signals or detector signal contributions which respond to a local effect on the first-track changing magnetic flux provided by adjacent signal modulating elements SME of the scale pattern 180. The sensing elements SEN are described in greater detail below with reference to FIG. 5.

It will be understood that a signal processing configuration (e.g., the signal processing configuration 566 of FIG. 5, etc.) may be operably connected to the detector portion 467 to provide the coil drive signal (e.g., at the connection points CP1 and CP2) and may be configured to determine the relative position between the detector portion 467 and the scale pattern 180 based on detector signals input from the detector portion 467 (e.g., at the detector signal output connections SDS1 and SDS2 as shown in FIG. 4, and as described in greater detail below with reference to the signal processing configuration 566 shown in FIG. 5.)

FIG. 5 is an isometric view "wire frame" diagram illustrating the first exemplary implementation generally corresponding to FIG. 4, in which one exemplary implementation of the relative placement of field generating elongated portions EPS1 and EPS2, and the shielded end section SES and end conductor path ECP of the field generating coil configuration FGC, and the conductive receiver loops CRL in the detector portion 467 is more clearly illustrated. Fewer sensing elements SEN and/or conductive receiver loops CRL are included in FIG. 5 than in FIG. 4 for clarity of illustration, but these elements may otherwise be understood to be similar in FIGS. 4 and 5. FIG. 5 may be regarded as partly representational, partly schematic. The "first-track" suffix "(FT)" used in FIG. 4 has been omitted from the reference numerals/designation throughout FIG. 5, for clarity of illustration. However, it will be understood that the elements illustrated in FIG. 5 may be considered as "first-track" elements despite this omission, and may alternatively be considered to be usable as "second-track" elements (corresponding to a reference designation suffix "(ST)", usable in certain implementations described in greater detail below. It will be appreciated that the elements of the detector portion 467 of FIG. 5 may be similar or identical to the similarly numbered elements of the detector portion 467 of FIG. 4 and may be generally understood by analogy thereto. Therefore, only certain features of FIG. 5 are described in detail below, as needed to emphasize novel features and/or benefits according to principles disclosed and claimed herein.

As shown in FIG. 5, the signal modulating scale pattern 180 includes the first pattern track FPT having the previously outlined features and dimensions. The detector portion 467 is configured to be mounted proximate to the first pattern track FPT and to displace relative to it along the measuring axis direction MA. It will be understood that the detector portion 467 includes a multi-layer circuit element, e.g., as previously outlined herein, and represented by its conductive layers as described below, which are separated by insulating layers according to known principles. The multi-layer circuit element will be understood to have a front surface that faces the scale that carries the scale pattern 180 during normal operation. The detector portion 467 comprises the field generating coil configuration FGC that is fixed on the multi-layer circuit element, as well as at least one first-track shielded end configuration SEC, and a plurality of sensing elements SEN comprising conductive receiver loops CRL, as described in greater detail below.

As shown in FIG. 5, the field generating coil configuration FGC comprises an input portion INP, and a first-track field generating coil portion FGCP configured to nominally surround a first-track generated field area GFA that is nominally aligned with the first pattern track FPT and generate a first-track changing magnetic flux in the first-track generated field area GFA in response to the coil drive signal from the signal processing configuration 566.

In the particular implementation shown in FIG. 5, the input portion INP comprises the two input connection portions ICP1A, and ICP2A, which are respectively connected to input connection portions ICP1B, and ICP2B that connect the field generating coil configuration FGC to the coil drive signal from the signal processing configuration 566.

The first-track field generating coil portion FGCP illustrated in FIG. 5 comprises the first-track first-side elongated portion EPS1 and first-track second-side elongated portion EPS2, which are fabricated in one or more elongated portion layer EPL of the multi-layer circuit element. The layer EPL and other layers described herein are represented in FIG. 5 by reference designations and dashed lines that correspond to exemplary planes for such layers. The first-track first-side elongated portion EPS1 and first-track second-side elongated portion EPS2 extend along the x-axis direction proximate to first and second sides S1, S2 of the first-track generated field area GFA. The first-track first-side and second-side elongated portions EPS1 and EPS2 collectively span or define a first-track elongated portion length dimension EPDX along the x-axis direction, and a y-axis direction separation between the first-track first-side and second-side elongated portions EPS1 and EPS2 defines a nominal first-track generated field area width dimension GFADY.

The first-track field generating coil portion FGCP further comprises a first-track shielded end section SES that is fabricated in a first-track shielded end section layer SESL of the of the multi-layer circuit element and that spans the y-axis direction separation between the first-track first-side and second-side elongated portions EPS1 and EPS2 and that is included in an end conductor path ECP that connects the first-track first-side and second-side elongated portions EPS1 and EPS2 in the first-track field generating coil portion FGCP. In the particular implementation shown in FIG. 5, the end conductor path ECP comprises the first-track shielded end section SES, end conductor path portions ECP1B, and ECP2B, and the two end conductor path portions ECP1A, and ECP2A, which are feedthrough elements respectively connected to the end conductor path portions ECP1B, and ECP2B to connect the first-track first-side and second-side elongated portions EPS1 and EPS2 through the shielded end section SES in the first-track field generating coil portion FGCP. In the particular implementation shown in FIG. 5 the shielded end section SES is offset along the x-axis direction from the ends of the elongated portions EPS1 and EPS2, which necessitates the use of the end conductor path portions ECP1B, and ECP2B in the end conductor path ECP. In an alternative implementation (not shown in FIG. 5) the shielded end section SES need not be significantly offset along the x-axis direction from the ends of the elongated portions EPS1 and EPS2 (particularly in alternative configurations where the conductive shield region is enlarged along the x-axis direction as indicated by the arrows A1 or A2 in FIG. 5.) In such an alternative implementation, and the end conductor path portions ECP1B, and ECP2B may be omitted. That is, the feedthrough element ECP1A may connect the first elongated portion EPS1 to a first end of the "non-offset" shielded end section SES, and the feedthrough element ECP2A may connect the second elongated portion EPS2 to a second end of the "non-offset" shielded end section SES. As shown in FIG. 5, the two end conductor path portions or feed through elements ECP1A, and ECP2A extend along the z-axis direction and utilize insulated voids INSV to pass through the conductive shield region CSR and connect the first-track first-side and second-side elongated portions EPS1 and EPS2 through the shielded end section SES via the end conductor path ECP. In various implementations, which may use various configurations of the conductive shield region CSR and/or end conductor path ECP, each connection between a first-track elongated portion such as EPS1 or EPS2 and a first-track shielded end section SES comprises a feedthrough element (e.g., a PCB feedthrough element) similar to those outlined above.

In the particular implementation shown in FIG. 5, the first-track shielded end configuration SEC comprises the first-track shielded end section SES outlined above as well as a first-track conductive shield region CSR, which in one implementation may be configured approximately as illustrated in solid outline in the first-track shielded end configuration SEC in FIG. 5. As shown in FIG. 5, the conductive shield region CSR may be considered to be included in a conductive shield region configuration CSRC (which may include additional conductive shield regions CSR', in some implementations). The conductive shield region CSR generally extends along the x-axis and y-axis directions to various extents in various implementations, and is fabricated in a first-track shield region layer SRL that is located between the first-track shielded end section layer SESL and one or more receiver loop layers RLL (e.g., RLL1 and RLL2) of the multi-layer circuit element, with respect to their locations along a z-axis direction.

As shown in FIGS. 4 and 5, the plurality of sensing elements SEN (e.g., SEN1-SEN24) comprise respective conductive receiver loops CRL (e.g., CRL1-CRL24) fabricated in the one or more receiver loop layers RLL (e.g., RLL1 and RLL2) of the multi-layer circuit element, wherein the conductive receiver loops CRL are distributed along the x-axis direction over a first-track sensing element area SEA) (having the corresponding dimensions SEADX and SEADY) that is nominally aligned with the first pattern track FPT. The sensing elements SEN are configured to provide detector signals or detector signal contributions which respond to a local effect on the first-track changing magnetic flux provided by adjacent signal modulating elements SME of the scale pattern 180. In the particular implementation illustrated in FIG. 5, the conductive receiver loops CRL do not overlap with the first-track first-side and second-side elongated portions EPS1 and EPS2. Thus, in contrast to the layers in the detector portion 267, in some implementations of the detector portion 467 the elongated portion layer EPL and one of the receiver loop layers RLL1 or RLL2 may be the same layer of the multi-layer circuit element, and at least one of the first-track elongated portions EPS1 and EPS2 and at least some portions of the conductive receiver loops CRL may be fabricated in that same layer.

As previously outlined in describing the particular input portion INP shown in FIG. 5, the signal processing configuration 566 may be operably connected to the detector portion 467, e.g., through the two input connection portions ICP1A, and ICP2A, which are respectively connected to input connection portions ICP1B, and ICP2B that connect the field generating coil configuration FGC to the coil drive signal from the signal processing configuration 566. The signal processing configuration 566 may be further configured to determine the relative position between the detector portion 467 and the scale pattern 180 based on detector signals input from the detector portion 467, e.g., at the detector signal output connections SDS1 and SDS2, as shown in FIG. 5. In the particular implementation shown in FIG. 5, the detector signal output connections SDS1 and SDS2 are connected to the signal processing configuration 566 through feedthrough elements DSFT1 and DSFT2, respectively, which utilize insulated voids INSV to pass through the conductive shield region CSR' and connect to the signal processing configuration 566. It will be appreciated that the connection portions and the conductive shield region CSR' used in the input portion INP are analogous to the end conductor portions and the shielded end section SES and the conductive shield region CSR used in the first-track shielded end configuration SEC in FIG. 5. It will be appreciated that in various implementations, it may be advantageous to utilizing principles analogous to those disclosed with reference to the first-track shielded end configuration SEC to shield various connection portions of the input portion INP (and circuits and connections related to the signal processing configuration 566, if desired).

FIGS. 4 and 5 show a single representative set of sensing elements SEN1-SEN24, which comprise conductive receiver loops CRL1-CRL24 which are connected in series. In this particular implementation, adjacent loop elements are connected by a configuration of conductors on the two conductive receiver loop layers RLL1 and RLL2 according to known methods such that they have opposite winding polarities, as previously outlined with reference to the detector portion 267. The sensing elements SEN (the conductive receiver loops CRL) are connected in series such that their detector signals or signal contributions are summed, and a "summed" detector signal is output at the detector signal output connections SDS1 and SDS2 to a signal processing configuration 566. Although FIGS. 4 and 5 show a single set of sensing elements SEN to avoid visual confusion, it will be appreciated that in various embodiments it is advantageous to configure the detector to provide one or more additional sets of sensing elements at a different spatial phase position (e.g., to provide quadrature signals) and to connect them to the signal processing configuration 566 in a similar fashion, as will be understood by one of ordinary skill in the art. Thus, it should be appreciated that the configurations of sensing elements SEN described herein are exemplary only, and not limiting. As one example, individual sensing element loops may output individual signals to a corresponding signal processing configuration in some embodiments, for example as disclosed in commonly assigned U.S. Pat. App. Pub. No. 2018/003524, which is hereby incorporated by reference in its entirety. More generally, various known sensing element configurations may be used in combination with the principles disclosed and claimed herein, for use in combination with various known scale pattern and signal processing schemes, in various embodiments.

The implementation(s) shown in FIGS. 4 and 5 include the following important and noteworthy features that differ from those used in the detector portions of known prior art electronic position encoders.

Firstly, the first-track sensing element area SEA(FT) extends over a first-track sensing element area length dimension SEADX(FT) along the x-axis direction and a first-track sensing element area width dimension SEADY(FT) along the y-axis direction, wherein the first-track sensing element area length dimension SEADX(FT) along the x-axis direction is longer than the first-track elongated portion length dimension EPDX(FT). Conversely, the first-track elongated portion length dimension EPDX(FT) may be significantly shorter than the first-track sensing element area length dimension SEADX(FT) along the x-axis direction. Surprisingly, the inventor has determined that such a configuration may allow unexpected tradeoffs and advantages related to signal levels, S/N ratio and/or accuracy, and fabrication costs in an electronic position encoder according to principles disclosed herein. For example, it should be appreciated that in such a case, the detector portion 467 may be significantly shorter than known detector portions, and the relatively shorter first-track first-side and second-side elongated portions EPS1 and EPS2 may contribute significantly less resistance to the relative shorter field generating configuration FGC, which may also have an inherently lower impedance compared to known field generating configurations. As a consequence, unexpectedly high signal levels may be achieved in a practical manner while deleterious end effects may be relative suppressed as outlined below, such that various constraints on the configuration of known field generating configurations and detector portions taught in the prior art may be relaxed or eliminated, while also reducing fabrication costs.

In some such implementations, the first-track sensing element area length dimension SEADX along the x-axis direction may extend beyond the first-track elongated portion length dimension EPDX at each end by at least an amount SE, as shown in FIG. 5. In some implementations, the inventor has discovered that it may be advantageous for accuracy if the amount SE is at least K times the nominal first-track generated field area width dimension GFADY, where K is a number that is at least 1. In some such implementations, it may be more advantageous for accuracy if K is at least 2. As shown in FIG. 5, the signal modulating elements of the first pattern track may be arranged corresponding to a spatial wavelength WL along the x-axis direction. According to an additional design principle discovered by the inventor, in some implementations where K is at least 1, it may also be advantageous for accuracy if the amount SE is furthermore at least as large as WL. In some such implementations, it may be more advantageous for accuracy if the amount SE is furthermore at least as large as 2*WL.

Secondly, the first-track shielded end section SES is configured such that its z-axis projection along the z-axis direction toward the receiver loop layers at least partially overlaps with the conductive receiver loops CRL in the first-track sensing element area SEA, e.g., as best shown in FIG. 5 with reference to the first-track shielded end section SES and the conductive receiver loops CRL. It may be understood that this feature is associated with the first-track elongated portion length dimension EPDX being shorter than the first-track sensing element area length dimension SEADX along the x-axis direction, as outlined above. However, it is noteworthy that this configuration feature has been explicitly avoided in the teachings of the '335 patent and known prior art detection portions, and therefore imposed undesirable design limitations which affected the cost, size and/or accuracy that could be achieved with such detector portions.

Thirdly, the inventor has discovered that it is advantageous (e.g., for accuracy, robustness, and/or to facilitate low-cost fabrication) in various implementations (or possibly all implementations) if the first-track conductive shield region CSR is configured in its first-track shield region layer SRL such that it is interposed between the first-track shielded end section SES and the conductive receiver loops CRL in the first-track sensing element area SEA and configured to intercept at least a majority of area of the z-axis projection ZPROJ of the first-track shielded end section SES that overlaps with the conductive receiver loops CRL in the first-track sensing element area SEA. It will be understood that the conductive shield region CSR shown in solid outline in FIG. 5 is configured to intercept all of area of the z-axis projection ZPROJ of the first-track shielded end section SES that overlaps with the conductive receiver loops CRL in the first-track sensing element area SEA (except where it includes insulating voids INSV that surround conductive feedthroughs that extend generally along the z-axis direction and pass through that at least one first-track conductive shield region CSR), which may be advantageous in various implementations. However, in some implementations, a significant and sufficient benefit to accuracy may be achieved if the illustrated first-track conductive shield region CSR is shrunk along the x-axis direction as indicated by the arrow A3, wherein the first-track conductive shield region CSR would be configured to intercept at least a majority of area of the z-axis projection ZPROJ of the first-track shielded end section SES. In either case, known detector portion implementations (e.g., such as those taught in the '335 patent) do not recognize such configurations of a conductive shield region CSR as an important, useful, or adaptable feature because they utilize a fundamentally different configuration or location relationship between the first-track shielded end section SES and the conductive receiver loops CRL in the first-track sensing element area SEA.

It will be understood that the function of the first-track conductive shield region CSR or the like is to mitigate or eliminate the error inducing "end effect" interaction of the fields generated proximate to the first-track shielded end section SES with the sensing elements SEN in the first-track sensing element area SEA and/or the signal modulating elements SME. The description of the configuration of the conductive shield region CSR relative to a hypothetical projection of one or more of these elements is simply a practical way of defining advantageous implementations which achieve the desired mitigation or elimination of such error inducing "end effect" interactions.

The inventor has discovered that, in some implementations, it may be advantageous if a first-track conductive shield region CSR configured according to principles outlined above is furthermore configured according to an additional design principle or design perspective, wherein it is furthermore configured such that it intercepts at least a majority of area of a projection along the z-axis direction of the conductive receiver loops CRL that are distributed in an end portion of first-track sensing element area SEA that is located outside an end of the first-track elongated portion length dimension EPDX that corresponds to the location of the first-track shielded end section SES. By way of further explanation, and not by way of limitation, in the implementation shown in FIG. 5 this description approximately corresponds to a projection along the z-axis direction of the conductive receiver loops CRL that are distributed along the dimension SE in the first-track sensing element area SEA. It will be recognized that the first-track conductive shield region CSR shown in solid outline in FIG. 5 is configured according to this additional design principle.

The inventor has discovered that, in some implementations, it may be advantageous if a first-track conductive shield region CSR configured according to principles outlined above is furthermore configured according to an additional design principle or design perspective, wherein it is furthermore configured such that it intercepts all of the area of a projection along the z-axis direction of at least one conductive receiver loop CRL that is distributed in a portion of first-track sensing element area SEA that is located inside an end of the first-track elongated portion length dimension EPDX that corresponds to the location of the first-track shielded end section SES. By way of further explanation, and not by way of limitation, in the implementation shown in FIG. 5 this description approximately corresponds to a projection along the z-axis direction of the conductive receiver loop CRL14 and corresponds to enlarging the illustrated first-track conductive shield region CSR along the x-axis direction approximately as indicated by the arrow A1.

The inventor has discovered that, in some implementations, it may be advantageous if a first-track conductive shield region CSR configured according to principles outlined above is furthermore configured such that it intercepts all of the area of a projection along the z-axis direction of all of the conductive receiver loops CRL that are distributed in the first-track sensing element area SEA, except where that at least one first-track conductive shield region includes insulating voids that surround conductive feedthroughs that extend generally along the z-axis direction and pass through that at least one first-track conductive shield region. By way of further explanation, and not by way of limitation, in the implementation shown in FIG. 5 this description approximately corresponds to enlarging the illustrated first-track conductive shield region CSR along the x-axis direction approximately as indicated by the arrow A2 and merging the conductive shield region CSR' with/into the conductive shield region CSR in the conductive shield region configuration CSRC.

It should be appreciated that the design principles and implementations disclosed above with reference to FIG. 4 and FIG. 5 differ in several important ways from the prior art implementation(s) taught in the '335 patent and shown in FIG. 2 and FIG. 3.

According to a first principle disclosed above, the first-track sensing element area SEA(FT) extends over a first-track sensing element area length dimension SEADX(FT) along the x-axis direction and a first-track sensing element area width dimension SEADY(FT) along the y-axis direction, wherein the first-track sensing element area length dimension SEADX(FT) along the x-axis direction is longer than the first-track elongated portion length dimension EPDX(FT). The dimension in FIG. 2 that is analogous to the first-track sensing element area length dimension SEADX (FT) is marked SEADXana (the suffix "ana" means analogous) for convenience. The dimension in FIG. 2 that is analogous to the first-track elongated portion length dimension EPDX(FT) is marked EPDXana for convenience. It may be seen that in contrast to the design principle outlined above, the '335 patent teaches the opposite. That is, as shown in FIG. 2, the analog of the first-track sensing element area length dimension SEADXana along the x-axis direction is significantly shorter than the analog of the first-track elongated portion length dimension EPDXana. Or, stated another way, the first-track elongated portion length dimension EPDX(FT) shown in FIG. 4 is significantly shorter (e.g., half as long, or less) than its analog EPDXana shown in FIG. 2.

According to a second principle disclosed above, the first-track shielded end section SES(FT) shown in FIG. 4 is configured such that its z-axis projection along the z-axis direction toward the receiver loop layers at least partially overlaps with the conductive receiver loops CRL in the first-track sensing element area SEA(FT) (e.g., as shown and described in further detail with reference to the first-track shielded end section SES shown in FIG. 5.) The feature in FIGS. 2 and 3 that is analogous to the first-track shielded end section SES(FT) is marked SESana (the suffix "ana" means analogous) for convenience. It may be seen that in contrast to the design principle outlined above, the '335 patent teaches the opposite. That is, as shown in FIGS. 2 and 3, the analog of the first-track shielded end section SESana is configured such that it is intentionally located a significant distance from the nearest end conductive receiver loop CRL, and its z-axis projection along the z-axis direction toward the receiver loop layers is prohibited from overlapping with (that is, it is significantly distant from) the conductive receiver loops CRL in their corresponding sensing element area in FIGS. 2 and 3. This restriction taught in the '335 patent and shown in FIGS. 2 and 3 prevents several of the features and advantages associated with the electronic position encoder and detector portion design principles disclosed and claimed herein.

According to a third principle disclosed above, the first-track conductive shield region CSR(FT) is configured in its first-track shield region layer SRL such that it is interposed between the first-track shielded end section SES(FT) and the conductive receiver loops CRL in the first-track sensing element area SEA(FT) and configured to intercept at least a majority of area of the z-axis projection of the first-track shielded end section SES(FT) that overlaps with the conductive receiver loops CRL in the first-track sensing element area (e.g., as shown and described in detail with reference to the conductive shield region CSR and the conductive shield region configuration CSRC shown in FIG. 5.) The feature in FIG. 3 that is analogous to the conductive shield region CSR is likewise marked CSR. It may be seen in FIG. 3 that in contrast to the design principle outlined above, the '335 patent teaches that a conductive shield region CSR need not be configured in its first-track shield region layer (which is located at the Z location Zcsr in FIG. 3) such that it is interposed between the first-track shielded end section SES and the conductive receiver loops CRL in their corresponding first-track sensing element area. It may also be seen in FIG. 3 that in contrast to the design principle outlined above, the '335 patent further teaches that a conductive shield region CSR need not be configured to intercept at least a majority of area of the z-axis projection of the first-track shielded end section SES that overlaps with the conductive receiver loops CRL in the first-track sensing element area. That is, as shown in FIG. 3, the analog of the first-track shielded end section SESana is configured such that it and its corresponding conductive shield region CSR are intentionally located a significant distance from the nearest end conductive receiver loop CRL. As a consequence, its z-axis projection along the z-axis direction is prohibited from overlapping with (that is, it is significantly distant from) the conductive receiver loops CRL in their corresponding sensing element area in FIG. 3. Furthermore, the illustrated conductive shield region CSR in FIG. 3 is likewise significantly distant from the conductive receiver loops CRL in their corresponding sensing element area.

Thus, according to the foregoing explanation, the teachings in the '335 patent (e.g., as exemplified in FIGS. 2 and 3) do not conform to the electronic position encoder and detector portion design principles disclosed and claimed herein. This is because the '335 patent is directed to a detector portion configuration that includes certain fundamentally different element relationships than a detector portion configured according to principles and claimed disclosed herein. If there is an incidental mention of a configuration in the '335 patent which may fulfil an isolated design principle disclosed herein, it would be an accidental occurrence and not an intentional teaching. It would not be understandable by one of ordinary skill in the art as a particularly advantageous, desirable or adaptable design principle or feature that suggests the various design principles, features and synergistic combinations thereof that are disclosed and claimed herein.

Figure 6:
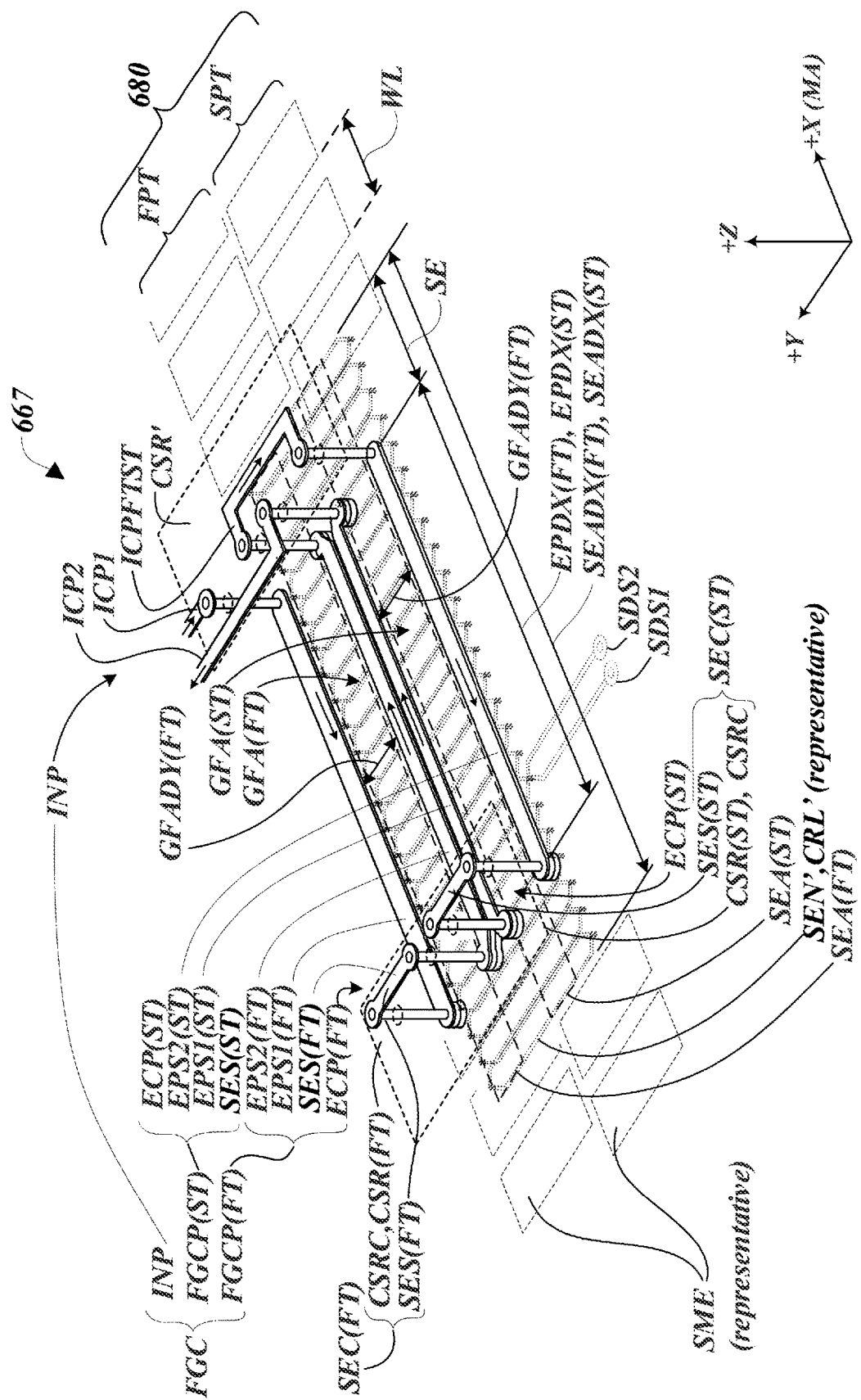
FIG. 6 is an isometric view diagram illustrating a second exemplary implementation of a detector portion according to principles disclosed herein and a compatible scale pattern usable in an electronic position encoder.

FIG. 6 is an isometric view "wire frame" diagram illustrating a second exemplary implementation of a detector portion 667 according to principles disclosed herein and a compatible scale pattern 680 usable in an electronic position encoder. The detector portion 667 has certain characteristics and components similar to the detector portion 467 of FIGS. 4-5. In particular, elements designated by similar reference numbers in FIG. 6 and FIGS. 4 and 5 (e.g., similar names or numerals or numerical "suffixes"), or elements that are otherwise obviously similar elements in various figures, are analogous elements, and may be understood to operate similarly, except as otherwise indicated below. Only certain features of FIG. 6 are described in detail below, insofar as that description is intended to emphasize novel features and/or benefits according to principles disclosed and claimed herein, and the figures may otherwise be understood by analogy to other figures and description included herein, or in the incorporated references, by one of ordinary skill in the art. The detector portion 667 and a compatible scale pattern 680 provide additional advantages with regard to providing more robust signal accuracy and/or signal strength in comparison to previously described implementations.

Broadly speaking, the primary differences between the embodiment of FIG. 6 and FIGS. 4 and 5 are as follows:

the scale pattern 680, in addition to the first pattern track FPT, further comprises a second pattern track SPT that is analogous to the previously described first pattern track FPT; and the detector portion 667, in addition to the first-track detector portion elements (generally identified by the suffix "(FT)", for "First Track"), further comprises second-track detector portion elements (generally identified by the suffix "(ST)", that are analogous to the previously described first-track detector portion elements.

As shown in FIG. 6, the signal modulating scale pattern 680 includes the first pattern track FPT which will be understood to have previously outlined features and dimensions, and the second pattern track SPT which is similar to the first pattern track FPT. The first and second pattern tracks FPT and SPT each include the same type of signal modulating elements SME that are arranged according to a same spatial period or wavelength WL along the x-axis direction in the first and second pattern tracks FPT and SPT, wherein the signal modulating elements SME in the second pattern track SPT are offset along the measuring axis direction by a nominal scale track offset of approximately WL/2 relative to the signal modulating elements in the first pattern track.

The detector portion 667 is configured to be mounted proximate to the first and second pattern tracks FPT and SPT and to displace relative to them along the measuring axis direction MA. It will be understood that the detector portion 667 includes a multi-layer circuit element, e.g., as previously outlined herein, with its conductive layers represented by the various conductive elements illustrated in FIG. 6, which are separated by insulating layers according to known principles as previously described herein. The detector portion 667 comprises the field generating coil configuration FGC that is fixed on the multi-layer circuit element, as well as at least one first-track shielded end configuration SEC, and a plurality of sensing elements SEN' comprising conductive receiver loops CRL', as described in greater detail below.

As shown in FIG. 6, the field generating coil configuration FGC comprises an input portion INP and first-track and second-track field generating coil portions FGCP(FT) and FGCP(ST). The first-track field generating coil portion FGCP(FT) is configured to nominally surround the first-track generated field area GFA(FT) that is nominally aligned with the first pattern track FPT and generate a first-track changing magnetic flux in the first-track generated field area GFA(FT) in response to the coil drive signal from a signal processing configuration. Similarly, the second-track field generating coil portion FGCP(ST) is configured to nominally surround the second-track generated field area GFA (ST) that is nominally aligned with the second pattern track FPT and generate a second-track changing magnetic flux in the second-track generated field area GFA(ST) in response to the coil drive signal from the signal processing configuration.

In the particular implementation shown in FIG. 5, the input portion INP comprises the two input connection portions ICP1 and ICP2, which are connected to the field generating coil configuration FGC through feedthroughs, and also connected to the signal processing configuration, as will be understood based on previous description.

The first-track field generating coil portion FGCP(FT) illustrated in FIG. 6 comprises the first-track first-side elongated portion EPS1 and first-track second-side elongated portion EPS2, which are fabricated in one or more elongated portion layer of the multi-layer circuit element as previously outlined. The first-track first-side elongated portion EPS1 (FT) and first-track second-side elongated portion EPS2(FT) extend along the x-axis direction proximate to first and second sides of the first-track generated field area GFA(FT). The first-track first-side and second-side elongated portions EPS1(FT) and EPS2(FT) collectively span or define a first-track elongated portion length dimension EPDX(FT) along the x-axis direction, and a y-axis direction separation between the first-track first-side and second-side elongated portions EPS1(FT) and EPS2(FT) defines a nominal first-track generated field area width dimension GFADY(FT). Similarly, the second-track first-side elongated portion EPS1 (ST) and second-track second-side elongated portion EPS2 (ST) extend along the x-axis direction proximate to first and second sides of the second-track generated field area GFA (ST). The second-track first-side and second-side elongated portions EPS1(ST) and EPS2(ST) collectively span or define a second-track elongated portion length dimension EPDX (ST) along the x-axis direction, and a y-axis direction separation between the second-track first-side and second-side elongated portions EPS1(ST) and EPS2(ST) defines a nominal second-track generated field area width dimension GFADY(ST).

The first-track field generating coil portion FGCP(FT) further comprises a first-track shielded end section SES(FT) that is fabricated in a first-track shielded end section layer of the multi-layer circuit element as previously outlined and that spans the y-axis direction separation between the first-track first-side and second-side elongated portions EPS1 (FT) and EPS2(FT) and that is included in an end conductor path ECP(FT) that also includes feedthroughs as illustrated and that connects the first-track first-side and second-side elongated portions EPS1(FT) and EPS2(FT) in the first-track field generating coil portion FGCP(FT). The second-track field generating coil portion FGCP(ST) further comprises a second-track shielded end section SES(ST) that is fabricated in a second-track shielded end section layer of the multi-layer circuit element as previously outlined and that spans the y-axis direction separation between the second-track first-side and second-side elongated portions EPS1(ST) and EPS2(ST) and that is included in an end conductor path ECP(ST) that also includes feedthroughs as illustrated and that connects the second-track first-side and second-side elongated portions EPS1(ST) and EPS2(ST) in the second-track field generating coil portion FGCP(ST).

In the particular implementation shown in FIG. 6, the first-track shielded end configuration SEC(FT) comprises the first-track shielded end section SES(FT) as well as a first-track conductive shield region CSR(FT), which in one implementation may be configured approximately as illustrated in dashed outline in the first-track shielded end configuration SEC(FT) in FIG. 6. The second-track shielded end configuration SEC(ST) comprises the second-track shielded end section SES(ST) as well as a second-track conductive shield region CSR(ST), which in one implementation may be configured approximately as illustrated in dashed outline in the second-track shielded end configuration SEC(ST) in FIG. 6. As shown in FIG. 6, the conductive shield regions CSR(FT) and CSR(ST) may be considered to be included in a conductive shield region configuration CSRC (which may include additional conductive shield regions CSR', in some implementations). According to previously outlined principles, the conductive shield regions CSR(FT) and CSR(ST) generally extend along the x-axis and y-axis directions to various extents in various implementations, and are fabricated in a shield region layer (or layers) that is (are) located between the shielded end section layer(s) of the detector portion 667 and the one or more receiver loop layers of the detector portion 667, with respect to their locations along the z-axis direction.

As shown in FIG. 6, the plurality of sensing elements SEN' comprise respective conductive receiver loops CRL' that are, fabricated in the one or more receiver loop layers of the multi-layer circuit element to operate according to previously outlined principles. However, one difference in the sensing elements SEN' compared to previously described implementations is that in the plurality of sensing elements the conductive receiver loops CRL' of the sensing elements SEN' are extended along the y-axis direction to overlap both the first pattern track FPT and the second pattern track SPT. Thus, they are distributed along the x-axis direction over both the first-track sensing element area SEA(FT) and also over the second-track sensing element area SEA(ST) that is nominally aligned with the second pattern track SPT. The sensing elements SEN' are thus configured to provide detector signals or detector signal contributions which respond to a local effect on the first-track changing magnetic flux provided by adjacent signal modulating elements SME of the first pattern track FPT of the scale pattern 180', and also respond to a local effect on the second-track changing magnetic flux provided by adjacent signal modulating elements SME of the second pattern track SPT of the scale pattern 180'.

As indicated by the current flow arrows in FIG. 6, the field generating coil configuration FGC is configured to generate the first-track changing magnetic flux with a first polarity in the first-track generated field area GFA(FT), and generate the second-track changing magnetic flux with a second polarity that is opposite to the first polarity in the second-track generated field area GFA(ST). The conductive receiver loops CRL' are configured to extend along the y-axis direction into both the first-track and second-track sensing element areas SEA(FT) and SEA(ST) and provide the same sensing loop polarity in the first-track and second-track sensing element areas SEA(FT) and SEA(ST). This configuration, operating in combination with the scale track offset of approximately WL/2 in the first and second pattern tracks FPT and SPT, produces reinforcing signal contributions from the first-track and second-track sensing element areas SEA(FT) and SEA(ST) in each of the sensing elements SEN'.

In the particular implementation illustrated in FIG. 6, the conductive receiver loops CRL' overlap with various elongated portions of the field generating coil configuration. Thus, in this particular implementation of the detector portion 667 the elongated portion layer(s) EPL are not the same layers as the receiver loop layers of the multi-layer circuit element, and blind vias (such as that term is used in printed circuit board manufacturing technology, or other multi-layer fabrication technology) may be required for the fabrication of the conductive receiver loops CRL', such that they remain insulated from the elongated portion layer(s) EPL. However, based on the teachings of this disclosure, one of ordinary skill in the art will understand that such an implementation is exemplary only, and not limiting.

It will be appreciated that a signal processing configuration (e.g., analogous to the signal processing configuration 566) may be operably connected to the detector portion 667, through the two input connection portions ICP1 and ICP2, and through the detector signal output connections SDS1 and SDS2 and the like, in a manner analogous to the previously outlined with reference to FIG. 5, and/or known methods. The signal processing configuration may be configured to provide the coil drive signal to the field generating coil configuration FGC at the two input connection portions ICP1 and ICP2. The signal processing configuration may be further configured to determine the relative position between the detector portion 667 and the scale pattern 180' based on detector signals input from the detector portion 667, e.g., at the detector signal output connections SDS1 and SDS2, and the like.

It will be appreciated that the connection portions (e.g., the connection portion ICPFTST, ICP1, ICP2, feedthroughs, etc.), and the conductive shield region CSR' used in the input portion INP are analogous to the end conductor portions ECP, the shielded end sections SES, and the conductive shield regions CSR used in the first-track and second-track shielded end configurations SEC(FT) and SEC(ST) in FIG. 6. It will be appreciated that in various implementations, it may be advantageous to utilizing principles analogous to those disclosed with reference to the first-track and second-track shielded end configurations SEC(FT) and SEC(ST) to shield various connection portions of the input portion INP (and circuits and connections related to the signal processing configuration, if desired).

It will be appreciated that the detector portion 667 shown in FIG. 6 and described above includes the important and noteworthy features previously outlined with reference to FIGS. 4 and 5, which differ from those used in the detector portions of known prior art electronic position encoders, and provide previously outlined advantages and benefits. To briefly summarize:

- Firstly, the first-track sensing element area SEA(FT) extends over a first-track sensing element area length dimension SEADX(FT) that is longer than the first-track elongated portion length dimension EPDX(FT) along the x-axis direction. Similarly, the second-track sensing element area SEA(ST) extends over a second-track sensing element area length dimension SEADX(ST) that is longer than the second-track elongated portion length dimension EPDX(ST) along the x-axis direction.
- Secondly, the first-track shielded end section SES(FT) is configured such that its z-axis projection along the z-axis direction toward the receiver loop layers at least partially overlaps with the conductive receiver loops CRL' in the first-track sensing element area SEA(FT). Similarly, the second-track shielded end section SES(ST) is configured such that its z-axis projection along the z-axis direction toward the receiver loop layers at least partially overlaps with the conductive receiver loops CRL' in the second-track sensing element area SEA(ST).
- Thirdly, the first-track conductive shield region CSR(FT) is configured in its first-track shield region layer such that it is interposed between the first-track shielded end section SES(FT) and the conductive receiver loops CRL' in the first-track sensing element area SEA(FT) and configured to intercept at least a majority of area of the z-axis projection of the first-track shielded end section SES(FT) that overlaps with the conductive receiver loops CRL' in the first-track sensing element area SEA(FT). Similarly, the second-track conductive shield region CSR(ST) is configured in its second-track shield region layer (which may be the same as the first-track shield regions layer) such that it is interposed between the second-track shielded end section SES(ST) and the conductive receiver loops CRL' in the second-track sensing element area SEA(ST) and configured to intercept at least a majority of area of the z-axis projection of the second-track shielded end section SES(ST) that overlaps with the conductive receiver loops CRL' in the second-track sensing element area SEA(ST).

It will be understood that the conductive shield regions CSR(FT) and CSR(ST) shown in FIG. 6 are configured to intercept all of area of the z-axis projection of the first-track and second-track shielded end sections SES(FT) and SES(ST) that overlaps with the conductive receiver loops CRL' in the first-track and second-track sensing element areas SEA(FT) and SEA(ST) (except where it includes insulating voids that surround conductive feedthroughs), which may be advantageous in various implementations. However, in some implementations, a significant and sufficient benefit to accuracy may be achieved if the first-track and second-track conductive shield regions CSR(FT) and CSR(ST) are shrunk somewhat along the x-axis direction but still configured intercept at least a majority of area of the z-axis projection of the first-track and second-track shielded end sections SES(FT) and SES(ST). This and other modifications according to previously outlined principles may be made in the detector portion 667.

Figure 7:
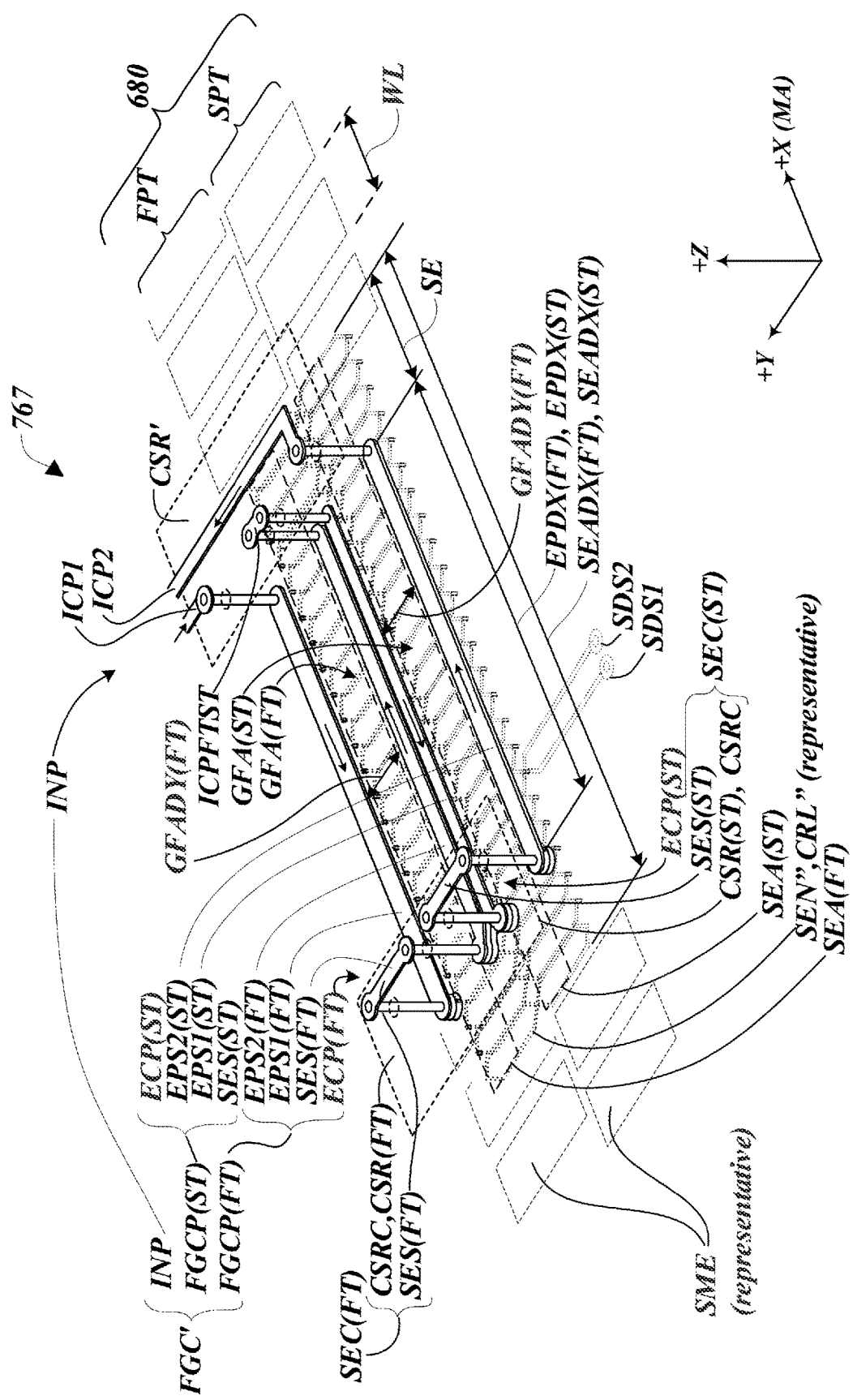
FIG. 7 is an isometric view diagram illustrating a third exemplary implementation generally according to principles disclosed herein and a compatible scale pattern usable in an electronic position encoder.

FIG. 7 is an isometric view "wire frame" diagram illustrating a third exemplary implementation of a detector portion 767 according to principles disclosed herein and a compatible scale pattern 680 usable in an electronic position encoder. The scale pattern 680 may be similar or identical to the scale pattern 680 described with reference to FIG. 6. The detector portion 767 is substantially similar to the detector portion 667 described with reference to FIG. 6, and may be understood by analogy, with the exception of the differences outlined below. Elements designated by similar reference numbers in FIG. 7 and FIG. 6 (e.g., similar names or numerals or numerical "suffixes"), are analogous elements, and may be understood to operate similarly, and provide similar benefits and advantages, except as otherwise indicated below.

Broadly speaking, the primary differences between the embodiments of FIG. 7 and FIG. 6 are associated with certain aspects of the field generating coil configuration FGC' and the plurality of sensing elements SEN" comprising conductive receiver loops CRL", as described in greater detail below.

As shown in FIG. 7, in the field generating coil configuration FGC' the input portion INP is differently configured than it is in FIG. 6. In particular, the connection portion ICP2 is connected to the elongated portion EPS2(ST) rather than the elongated portion EPS1(ST), and the connection portion ICPFTST connects the elongated portion EPS2(FT) to the elongated portion EPS1(ST) rather than the elongated portion EPS2(ST).

As shown in FIG. 7, the plurality of sensing elements SEN" include a cross over or twisting of the conductive traces in their conductive receiver loops CRL", in a region including a first-track elongated portion and a second-track elongated portion between the first-track generated field area and the second-track generated field area, to thereby provide opposite sensing loop polarities in each respective sensing element SEN" in the first-track and second-track sensing element areas SEA(FT) and SEA(ST).

As a result of the foregoing, as indicated by the current flow arrows in FIG. 7, the field generating coil configuration FGC' is configured to generate the first-track changing magnetic flux with a first polarity in the first-track generated field area GFA(FT), and generate the second-track changing magnetic flux with a polarity that is the same as the first polarity in the second-track generated field area GFA(ST). The twisted conductive receiver loops CRL" configured as outlined above provide opposite sensing loop polarities in the first-track and second-track sensing element areas SEA(FT) and SEA(ST). This configuration, operating in combination with the scale track offset of approximately WL/2 in the first and second pattern tracks FPT and SPT, produces reinforcing signal contributions from the first-track and second-track sensing element areas SEA(FT) and SEA(ST) in each of the sensing elements SEN". Thus, the detector portion 767 provides substantially similar signals and advantages as the previously described detector portion 667.

Figure 8:
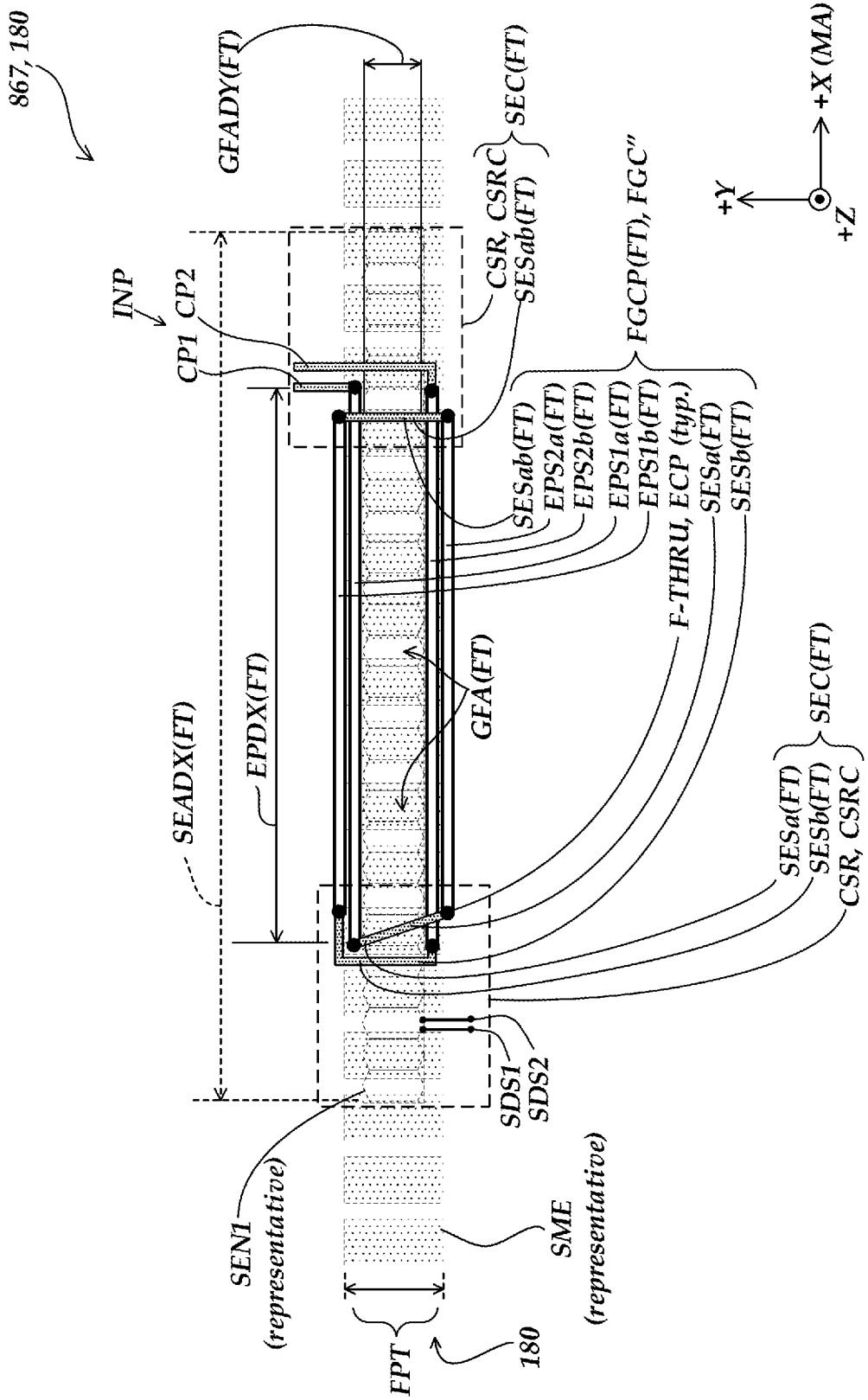
FIG. 8 is a plan view diagram illustrating a fourth exemplary implementation of a detector portion and a compatible scale pattern usable in an electronic position encoder.

FIG. 8 is a plan view diagram illustrating a fourth exemplary implementation of a detector portion 867 according to principles disclosed herein and a compatible scale pattern 180 usable in an electronic position encoder.

The scale pattern 180 may be similar or identical to the scale pattern 180 described with reference to FIGS. 4 and 5. The detector portion 867 is substantially similar to the detector portion 467 described with reference to FIGS. 4 and 5, and may be understood by analogy, with the exception of the differences outlined below. Elements designated by similar reference numbers in FIG. 8 and FIGS. 4 and 5 (e.g., similar names or numerals or numerical "suffixes"), are analogous elements, and may be understood to operate similarly, and provide similar benefits and advantages, except as otherwise indicated below.

Broadly speaking, the primary differences between the embodiments of FIG. 8 and FIGS. 4 and 5 are associated with certain aspects of the field generating coil configuration FGC", as described in greater detail below.

The various field generating coil configurations FGC previously shown and described herein may be characterized as "single turn" configurations, wherein only one conductive turn or loop surrounds a generated field area GFA. In some implementations, such a turn or loop may be a partial loop that incompletely surrounds the generated field area GFA, but nevertheless provides an operational generated field therein. In contrast, the detector portion 867 shown in FIG. 8 comprises a "two turn" configuration, as described in greater detail below.

It will be understood in FIG. 8 that the elongated portions EPXXx(FT) of the field generating coil configuration FGC" are fabricated in an elongated portion layer of the detector portion 867, according to previously outlined principles. Other portions of the field generating coil configuration FGC" such as the shielded end sections SESx(FT) that are illustrated with a darker fill in FIG. 8, are fabricated in a shielded end section layer of the detector portion 867, according to previously outlined principles. Connections between such layers are made by feedthroughs F-THRU, according to previously outlined principles. Feedthroughs F-THRU are represented by black filled circles in FIG. 8.

As shown in FIG. 8, the field generating coil configuration FGC" comprises the following arrangement:
the input connection CP1 is connected to a first first-side elongated portion EPS1a(FT) connected in series to a first second-side elongated portion EPS2a(FT) by a shielded end section SESa(FT) in a shielded end section configuration SEC(FT) at a first end of the field generating coil configuration FGC";
the first second-side elongated portion EPS2a(FT) is connected in series to a second first-side elongated portion EPS1b(FT) by a shielded end section SESab (FT) in a shielded end section configuration SEC(FT) at a second end of the field generating coil configuration FGC";

the second first-side elongated portion EPS1*b*(FT) is connected in series to a second second-side elongated portion EPS2*b*(FT) by a shielded end section in the shielded end section SEC(FT) configuration at the first end of the field generating coil configuration FGC"; and the second second-side elongated portion EPS2*b*(FT) is connected to the input connection CP2 proximate to the shielded end section configuration SEC(FT) at the second end of the field generating coil configuration FGC".

It should be appreciated that such a two-turn configuration may become advantageous or desirable in detector portion according to principles disclosed herein, wherein the field generating coil configuration FGC" may be significantly shorter along the x-axis direction than those used in previous known detector portions that offer similar performance and accuracy. As previously explained herein, the significantly shorter elongated portions EP allowed according to principles disclosed and claimed herein inherently allow the field generating coil configuration FGC" to have significantly less resistance and/or impedance, compared to known field generating configurations. As a consequence, an additional turn or loop may be added to field generating coil configuration FGC", to adjust (increase) the impedance to a desirable level for driving resonant oscillations of the coil in some implementations, without exceeding practical or desirable limitations for the resistance and/or impedance of field generating coil configuration FGC". In some such implementations, an unexpectedly high S/N ratio and/or accuracy may be achieved. It should be appreciated that, in some implementations, it may be desirable to use a field generating coil configuration FGC that is a "three turn" configuration, or more.

Figure 9:
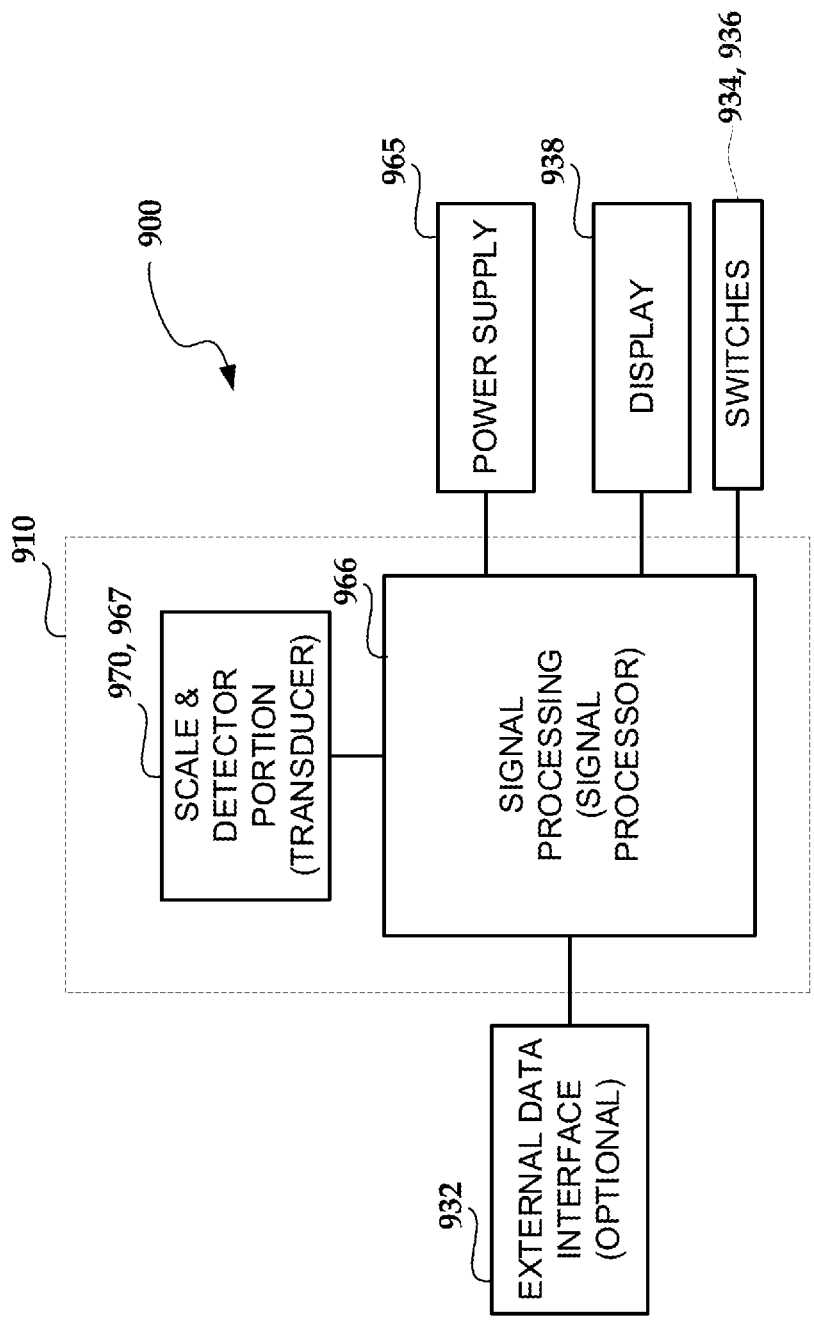
FIG. 9 is a block diagram illustrating one exemplary implementation of components of a measurement system including an electronic position encoder.

FIG. 9 is a block diagram illustrating one exemplary implementation of components of a measurement system 900 including an electronic position encoder 910. It will be appreciated that certain numbered components 9XX of FIG. 6 may correspond to and/or have similar operations as similarly numbered components 1XX of FIG. 1, except as otherwise described below. The electronic position encoder 910 includes a scale 970 and a detector portion 967, which together form a transducer, and a signal processing configuration 966. In various implementations, the detector portion 967 may include any of the configurations described above with respect to FIGS. 2-8, or other configurations. The measurement system 900 also includes user interface features such as a display 938 and user-operable switches 934 and 936, and may additionally include a power supply 965. In various implementations, an external data interface 932 may also be included. All of these elements are coupled to the signal processing configuration 966 (or signal processing and control circuit), which may be embodied as a signal processor. The signal processing configuration 966 may provide a drive signal to a field generating coil configuration in the detector portion 967 and determine a position of the sensing elements of the detector portion 967 relative to the scale 970 based on detector signals input from the detector portion 967, as previously outlined herein.

In various implementations, the signal processing configuration 966 of FIG. 9 (and/or the other signal processing configurations shown and described herein) may comprise or consist of one or more processors that execute software to perform the functions described herein. Processors include programmable general-purpose or special-purpose microprocessors, programmable controllers, application-specific integrated circuits (ASICs), programmable logic devices (PLDs), or the like, or a combination of such devices. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. The various implementations and features described above can be combined to provide further implementations. All of the U.S. patents and U.S. patent applications referred to in this specification are incorporated herein by reference, in their entirety. Aspects of the implementations can be modified, if necessary, to employ concepts of the various patents and applications to provide yet further implementations. As one example, it will be appreciated that various features and principles disclosed herein may be applied to rotary position encoders, wherein the x-axis direction and y-axis direction referred to in the description above and in the claims are to be respectively construed as corresponding to a circular measuring axis direction and a radial direction when applied to such rotary position encoders.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

What is claimed is:

1. An electronic position encoder usable to measure a relative position between two elements along a measuring axis direction that coincides with an x-axis direction, the electronic position encoder comprising:

a scale extending along the measuring axis direction and including a signal modulating scale pattern including at least a first pattern track having a pattern track width dimension along a y-axis direction that is perpendicular to the x-axis direction, each pattern track including signal modulating elements that are arranged to provide a spatially varying characteristic which changes as a periodic function of position along the x-axis direction, a detector portion configured to be mounted proximate to the at least first pattern track and to move along the measuring axis direction relative to the at least first pattern track, the detector portion including a multi-layer circuit element having a front surface that faces the scale during normal operation, including:

a field generating coil configuration fixed on multi-layer circuit element, including:

an input portion including at least two connection portions that connect the field generating coil configuration to a coil drive signal from a signal processing configuration; and a first-track field generating coil portion configured to nominally surround a first-track generated field area that is nominally aligned with the first pattern track and generate a first-track changing magnetic flux in the first-track generated field area in response to the coil drive signal, the first-track field generating coil portion comprising:

first-track first-side and second-side elongated portions fabricated in one or more elongated portion layer of the multi-layer circuit element and extending along the x-axis direction proximate to first and second sides of the first-track generated field area, wherein the first-track first-side and second-side elongated portions collectively span or define a first-track elongated portion length dimension along the x-axis direction, and a y-axis direction separation between the first-track first-side and second-side elongated portions defines a nominal first-track generated field area width dimension; and a first-track shielded end section that is fabricated in a first-track shielded end section layer of the multi-layer circuit element and that spans the y-axis direction separation between the first-track first-side and second-side elongated portions and that is included in an end conductor path that connects the first-track first-side and second-side elongated portions in the first-track field generating coil portion; and at least one first-track shielded end configuration, comprising:

the first-track shielded end section; and a conductive shield region configuration comprising at least one first-track conductive shield region that extends along the x-axis and y-axis directions and that is fabricated in a first-track shield region layer that is located between the first-track shielded end section layer and one or more receiver loop layers of the multi-layer circuit element, with respect to their locations along a z-axis direction that is nominally normal to the front surface of the multi-layer circuit element; and a plurality of sensing elements comprising respective conductive receiver loops fabricated in the one or more receiver loop layers of the multi-layer circuit element, wherein the conductive receiver loops are distributed along the x-axis direction over a first-track sensing element area that is nominally aligned with the first pattern track, and the sensing elements are configured to provide detector signals or detector signal contributions which respond to a local effect on the first-track changing magnetic flux provided by adjacent signal modulating elements SME of the scale pattern; and a signal processing configuration that is operably connected to the detector portion to provide the coil drive signal and that is configured to determine the relative position between the detector portion and the scale pattern based on detector signals input from the detector portion, wherein:

the first-track sensing element area extends over a first-track sensing element area length dimension along the x-axis direction and a first-track sensing element area width dimension along the y-axis direction, wherein the first-track sensing element area length dimension along the x-axis direction is longer than the first-track elongated portion length dimension;

the first-track shielded end section is configured such that its z-axis projection along the z-axis direction toward the receiver loop layers at least partially overlaps with the conductive receiver loops in the first-track sensing element area; and the first-track conductive shield region is configured in its first-track shield region layer such that it is interposed between the first-track shielded end section and the conductive receiver loops in the first-track sensing element area and configured to intercept at least a majority of area of the z-axis projection of the first-track shielded end section that overlaps with the conductive receiver loops in the first-track sensing element area.

2. The electronic position encoder of claim 1, wherein at least one first-track conductive shield region is configured to intercept all of the area of the projection of the first-track shielded end section that overlaps with the receiver loops in the first-track sensing element area, except where that at least one first-track conductive shield region includes insulating voids that surround conductive feedthroughs that extend generally along the z-axis direction and pass through that at least one first-track conductive shield region.

3. The electronic position encoder of claim 1, wherein:

at least one elongated portion layer and at least one receiver loop layer are the same layer of the multi-layer circuit element, and at least one of the first-track elongated portions and at least some portions of the conductive receiver loops are fabricated in that same layer.

4. The electronic position encoder of claim 1, wherein each connection between a first-track elongated portion and a first-track shielded end section comprises a feedthrough that extends along the z-axis direction.

5. The electronic position encoder of claim 1, wherein the first-track field generating coil portion is configured with a two-turn configuration around the first-track generated field area, the two-turn configuration comprising:

a first first-side elongated portion connected in series to a first second-side elongated portion by a shielded end section in a shielded end section configuration at a first end;

the first second-side elongated portion connected in series to a second first-side elongated portion by a shielded end section in a shielded end section configuration at a second end; and the second first-side elongated portion connected in series to a second second-side elongated portion by a shielded end section in a shielded end section configuration at the first end.

6. The electronic position encoder of claim 1, wherein at least one first-track conductive shield region is furthermore configured such that it intercepts at least a majority of area of a projection along the z-axis direction of the conductive receiver loops that are distributed in an end portion of first-track sensing element area that is located outside an end of the first-track elongated portion length dimension that corresponds to the location of the first-track shielded end section.

7. The electronic position encoder of claim 6, wherein at least one first-track conductive shield region is furthermore configured such that it intercepts all of the area of a projection along the z-axis direction of at least one conductive receiver loop that is distributed in a portion of first-track sensing element area that is located inside an end of the first-track elongated portion length dimension that corresponds to the location of the first-track shielded end section.

8. The electronic position encoder of claim 7, wherein at least one first-track conductive shield region is configured such that it intercepts all of the area of a projection along the z-axis direction of all of the conductive receiver loops that are distributed in the first-track sensing element area, except where that at least one first-track conductive shield region includes insulating voids that surround conductive feedthroughs that extend generally along the z-axis direction and pass through that at least one first-track conductive shield region.

9. The electronic position encoder of claim 1, wherein:
the first-track sensing element area length dimension along the x-axis direction extends beyond the first-track elongated portion length dimension at each end by at least an amount SE that is at least K times the nominal first-track generated field area width dimension, where K is a number that is at least 1.

10. The electronic position encoder of claim 9, where K is at least 2.

11. The electronic position encoder of claim 9, wherein the signal modulating elements of the first pattern track are arranged corresponding to a spatial wavelength WL along the x-axis direction and SE is at least WL.

12. The electronic position encoder of claim 11, wherein SE is at least 2*WL.

13. The electronic position encoder of claim 1, wherein:
the signal modulating scale pattern includes a second pattern track arranged parallel to the first pattern track, the first and second pattern tracks each including the signal modulating elements distributed along the x-axis direction;
the field generating coil configuration includes:
a second-track field generating coil portion configured to nominally surround a second-track generated field area that is nominally aligned with the second pattern track and generate a second-track changing magnetic flux in the second-track generated field area in response to the coil drive signal, the second-track field generating coil portion comprising:
second-track first-side and second-side elongated portions fabricated in one or more elongated portion layer of the multi-layer circuit element and extending along the x-axis direction proximate to first and second sides of the second-track generated field area, wherein the second-track first-side and second-side elongated portions collectively span or define a second-track elongated portion length dimension along the x-axis direction, and a y-axis direction separation between the second-track first-side and second-side elongated portions defines a nominal second-track generated field area width dimension, and
a second-track shielded end section that is fabricated in a second-track shielded end section layer of the of the multi-layer circuit element and that spans the y-axis direction separation between the second-track first-side and second-side elongated portions and that is included in a conductor path that connects the second-track first-side and second-side elongated portions to form the second-track field generating coil portion; and
at least one second-track shielded end configuration, comprising:
the second-track shielded end section; and
a conductive shield region configuration comprising at least one second-track conductive shield region that extends along the x-axis and y-axis directions and that is fabricated in a second-track shield region layer that is located between the second-track shielded end section layer and one or more receiver loop layers of the multi-layer circuit element, with respect to their locations along a z-axis direction that is nominally normal to the front surface of the multi-layer circuit element; and
in the plurality of sensing elements the conductive receiver loops are further distributed along the x-axis direction over a second-track sensing element area that is nominally aligned with the second pattern track, and the sensing elements are further configured to provide detector signals or detector signal contributions which respond to a local effect on the second-track changing magnetic flux provided by adjacent signal modulating elements of the scale pattern,
wherein:
the second-track sensing element area extends over a second-track sensing element area length dimension along the x-axis direction and a second-track sensing element area width dimension along the y-axis direction, wherein the second-track sensing element area length dimension along the x-axis direction is longer than the second-track elongated portion length dimension; and
the second-track shielded end section is configured such that its z-axis projection along the z-axis direction toward the receiver loop layers at least partially overlaps with the conductive receiver loops in the second-track sensing element area; and
the second-track conductive shield region is configured in its second-track conductive shield region layer such that it is interposed between the second-track shielded end section and the receiver loops in the second-track sensing element area and configured to intercept at least a majority of area of the z-axis projection of the second-track shielded end section that overlaps with the receiver loops in the second-track sensing element area.

14. The electronic position encoder of claim 13, wherein:
the first and second pattern tracks each include the same type of signal modulating elements that are arranged according to a same spatial period or wavelength WL along the x-axis direction in the first and second pattern tracks, wherein the signal modulating elements in the second pattern track are offset along the measuring axis direction by a nominal scale track offset of approximately WL/2 relative to the signal modulating elements in the first pattern track;
the field generating coil configuration is configured to generate the first-track changing magnetic flux with a first polarity in the first-track generated field area, and generate the second-track changing magnetic flux with a second polarity that is opposite to the first polarity in the second-track generated field area; and
at least a majority of the conductive receiver loops are configured to extend along the y-axis direction into both the first-track and second-track sensing element areas and provide the same sensing loop polarity in the first-track and second-track sensing element areas.

15. The electronic position encoder of claim 13, wherein the first-track field generating coil portion and the second-track field generating coil portion are each configured with a single turn configuration around their respective first-track generated field area and second-track generated field area.

16. The electronic position encoder of claim 13, wherein:
the first-track shielded end section layer and the second-track shielded end section layer are the same layer;
the first-track shield region layer and the second-track shield region layer are the same layer; and
the first-track first and second elongated portions and the second-track first and second elongated portions are fabricated in the same one or more elongated portion layers.

17. The electronic position encoder of claim 13, wherein:
the first and second pattern tracks each include the same type of signal modulating elements that are arranged according to a same spatial period or wavelength WL along the x-axis direction in the first and second pattern tracks, wherein the signal modulating elements in the second pattern track are offset along the measuring axis direction by a nominal scale track offset of approximately WL/2 relative to the signal modulating elements in the first pattern track;
the field generating coil configuration is configured to generate the first-track changing magnetic flux with a first polarity in the first-track generated field area, and generate the second-track changing magnetic flux with a polarity that is the same as the first polarity in the second-track generated field area; and
at least a majority of the conductive receiver loops are configured to extend along the y-axis direction into both the first-track and second-track sensing element areas and include a cross over or twisting of their conductive traces to provide opposite sensing loop polarities in the first-track and second-track sensing element areas.

18. The electronic position encoder of claim 17, wherein for at least a majority of the conductive receiver loops, the cross over or twisting of their conductive traces is located in a region including a first-track elongated portion and a second-track elongated portion between the first-track generated field area and the second-track generated field area.

* * * * *